(12) United States Patent
Kassemi et al.

(10) Patent No.: US 10,311,406 B2
(45) Date of Patent: Jun. 4, 2019

(54) SYSTEM AND METHOD HAVING INCREASED SECURITY USING SIMPLE MAIL TRANSFER PROTOCOL EMAILS VERIFIED BY SPF AND DKIM PROCESSES

(71) Applicant: SWOOP IP HOLDINGS LLC, Wilmington, DE (US)

(72) Inventors: James Kassemi, Albuquerque, NM (US); Lawrence Glen Holcomb, Albuquerque, NM (US)

(73) Assignee: SWOOP IP HOLDINGS LLC, Wilmington, DE (US)

( * ) Notice: Subject to any disclaimer, the term of this patent is extended or adjusted under 35 U.S.C. 154(b) by 0 days.

(21) Appl. No.: 14/461,008

(22) Filed: Aug. 15, 2014

(65) Prior Publication Data

US 2015/0052055 A1    Feb. 19, 2015

Related U.S. Application Data

(60) Provisional application No. 61/866,068, filed on Aug. 15, 2013.

(51) Int. Cl.
  *G06Q 10/10* (2012.01)
  *G06Q 20/12* (2012.01)
  (Continued)

(52) U.S. Cl.
  CPC .......... *G06Q 10/107* (2013.01); *G06Q 20/12* (2013.01); *G06Q 30/0241* (2013.01); *G06Q 40/00* (2013.01)

(58) Field of Classification Search
  CPC ...... G06Q 10/107; G06Q 10/10; G06Q 40/08; G06Q 40/00; G06Q 20/32; G06Q 20/04;
  (Continued)

(56) References Cited

U.S. PATENT DOCUMENTS 7,375,614 B2 * 5/2008 Franks ........................... 340/5.8
7,398,218 B1 * 7/2008 Bernaski et al. ................. 705/3
(Continued)

OTHER PUBLICATIONS

Weber, Ricarda "Chablis Market Analysis of Digital Payment Systems" Aug. 1998, Tum-Info.*
(Continued)

*Primary Examiner* — Kelly S Campen
(74) *Attorney, Agent, or Firm* — Volpe and Koenig, P.C.

(57) ABSTRACT

A system and method to facilitate transactions between a customer and a vendor utilizing an advertising campaign reaching a plurality of potential customers is provided. The method includes receiving a request from the vendor for a bulk token for use in the advertising campaign, generating the bulk token, transmitting the bulk token to the vendor to embed into the advertising campaign associated with a mailto link, the bulk token being sent as part of the advertising campaign to at least one of the plurality of potential customer, receiving a reply SMTP email from a customer from the plurality of potential customers indicating a request for a transaction responsive to the advertising campaign by selecting the mailto link, decoding the bulk token to verify the transaction, performing an SPF and DKIM validation of the received SMTP email to validate the transaction, and processing the verified and validated transaction.

10 Claims, 24 Drawing Sheets

(51) Int. Cl.
*G06Q 30/02* (2012.01)
*G06Q 40/00* (2012.01)

(58) Field of Classification Search
CPC .............. G06Q 20/045; G06Q 20/06; Y10S 707/99945; G07F 19/20
USPC .... 705/4, 14.19, 14.35, 18, 36, 30; 235/379, 235/375; 707/999.104
See application file for complete search history.

(56) References Cited

U.S. PATENT DOCUMENTS

| | | |
|---|---|---|
| 7,451,097 B1* | 11/2008 | Faupel et al. ..................... 705/4 |
| 2003/0014315 A1* | 1/2003 | Jaalinoja et al. ............... 705/18 |
| 2009/0228340 A1* | 9/2009 | Bohannon ....................... 705/10 |
| 2010/0299399 A1* | 11/2010 | Wanser et al. ................ 709/206 |
| 2012/0030047 A1* | 2/2012 | Fuentes et al. .............. 705/26.1 |
| 2013/0339065 A1* | 12/2013 | Denning et al. .................. 705/4 |

OTHER PUBLICATIONS

Chari et al. "Security Issues in M Commerce; A Usage Based Taxonomy" 2001, E Commerce Agents, LNAI 2033; pp. 264-282.*

* cited by examiner

Email Order Form 400

Send Chat Attach Address Fonts Colors Save As Draft      Photo Browser Show Stationery

To: transaction@processor.atpay.com  401

Cc: 402

Bcc: 403

Subject: Email Order Form  404

From: Patrick  405

Signature: Signature #4

Send this email order form to confirm your purchase of $50.00. If we need more info we will let you know. Thanks!

406

This code secures and validates your transaction:

@AAAAAAAAAI=ycOF9IoW-LLaauvo3oTgVHENioeYp24gAAAA
AAAAAE0BqWufnCnplzbQRwalXjwwHDUv_YegjCvuzLQu7xy2bf
G1xUJROrtMa9nqIpij1R9j2wizBh-5GvP3t64F3QoFvXLEZRD
XxuFjtaS9rEm6bDyDRWj4vG22RKlCj15TlAakAZRIvhD5aU=@

@pay

Request Money
Send requests,

1700

Create Request
Create Account
History
Join@Pay

Request Money
Use this form to request money from anymore with an email address.

Your Banking Information

Bank Account Number — 1701

Routina Number — 1702

Select Bank
JP Morgan Chase
Bank of America
Citizens Bank
— 1703

Enter Amount  $25.45 — 1704

Your Email — 1705

Email of the person sending money — 1706

Message — 1707

Send Request — 1708

| | From | Subject | Date received | |
|---|---|---|---|---|
| ✉ | John Doe | Request for the... | Yesterday | 6:53 PM |
| ⬇ | John Doe 1 | RE: Request ... | Yesterday | 5:52 PM |
| ⬇ | John Doe 2 | RE: Request ... | Yesterday | 4:27 PM |
| ⬆ | John Doe 3 | FW: New Pay ... | Yesterday | 4:06 PM |
| ⬇ | John Doe 4 | RE: Request ... | Yesterday | 12:52 PM |
| ✉ | John Doe 5 | Request for the... | Yesterday | 12:43 PM |
| ✉ | John Doe 6 | Request for the... | Yesterday | 12:01 PM |
| ⬆ | John Doe 7 | FW: New Pay ... | Yesterday | 5:30 PM |
| ⬆ | John Doe 8 | FW: New Pay ... | March 10, 2014 | 5:14 PM |
| ✉ | John Doe 9 | Request for the... | March 10, 2014 | 5:06 PM |
| ⬇ | John Doe 10 | RE: Request ... | March 10, 2014 | 4:23 PM |
| ⬇ | John Doe 11 | RE: Request ... | March 10, 2014 | 3:43 PM |
| ✉ | John Doe 12 | Request for the... | March 10, 2014 | 2:20 PM |
| ✉ | John Doe 13 | Request for the... | March 10, 2014 | 4:44 PM |
| ✉ | John Doe 14 | Request for the... | March 2, 2014 | 10:00 PM |

FIG. 23

SYSTEM AND METHOD HAVING INCREASED SECURITY USING SIMPLE MAIL TRANSFER PROTOCOL EMAILS VERIFIED BY SPF AND DKIM PROCESSES

CROSS REFERENCE TO RELATED APPLICATION

This application claims the benefit of U.S. Provisional Application No. 61/866,068, filed Aug. 15, 2013, which is incorporated by reference as if fully set forth.

FIELD OF INVENTION

The present invention is related to e-commerce.

BACKGROUND

Systems that use email to complete financial transactions have a range of technical issues that distinguish them from the issues in technology based in web URL financial transactions. In email-based systems, such as that disclosed in U.S. Pat. No. 8,775,263 entitled System and Method for Email-Based E-Commerce, the contents of which is incorporated herein, customers receive email messages with offers and the customer may make purchases directly by generating a reply email and sending it. Upon receiving this email a system authenticates the email and processes the payment. For businesses working in email-based transactions, the goal is to make email transactions easier than web-based URL transactions. The objective is to make a streamlined experience for the end customer (the person making the purchase, donation, or sending money). Additionally, the vendor may prefer to have a tool that is simple and easy to use. Both the customer and the vendor may desire an uncomplicated experience that streamlines the process of purchasing.

Users of online services increasingly accept certain norms and expectations when using different arenas within the online experience. One of these is the divide between the email account and the website. Even if the email account is viewed in a webpage, users perceive their email client as a personal space where they read private messages and correspond in a secure way. When they visit web pages to view information, people generally understand that they are viewing information that is public. For example, if they comment on an article, video or advertisement they generally understand that comment may being viewed by others. This perception of privacy may not be founded in reality given the nature of online monitoring, but these expectations have helped from consumer habits.

In a customer's email account, they expect to receive messages from people they know and with whom they have initiated a correspondence. Generally speaking, email advertisements are seen as an unwelcome, or at least are an impersonal form of message. In the instances where advertising is requested by a customer, these are still not seen as emails one may actually respond to or be in a correspondence with. Some of these advertising emails tell the recipient not to reply. These emails may be opportunities for organizations to place URL hyperlinks that may drive the customer to their sites. Removing the consumer from the email client is a missed opportunity to immediately close a deal. A system that allows an organization to correspond with a customer through emails without having to visit a webpage would be welcome in the market place. If the customers receiving these emails have the ability to forward them onto their friends and share them with other customers, this may be a great convenience to both customers and vendors.

In the development of the email payment gateway one challenge is the identification and classification of a consumer. A consumer may have a payment method on file, or may be a new customer. A consumer without a payment method on file may first be directed to a system where that payment method may be selected. A consumer with a payment method may not need to be directed to this system. For the email commerce system, email service provider or vendor, providing this variation in behavior may require that emails be managed and often segmented between those that are registered with the email payment gateway and those consumers who are not. This organizational burden often outweighs the benefits of the tool. A system that does not require email lists to be segmented but still provides payment collection instructions for new users and uses the configured payment method for existing users would be welcome by vendors who need a more convenient way to use the email payment gateway.

Currently, a vendor using the email payment gateway requires a system that creates a distinct and separate email token for each individual customer. The information within the email correspondence is targeted to a specific user. In email marketing, this limits the behavior of all the participants.

A payment or purchase email that is designed so that an e-commerce system may identify that the email returned to the system is from either a registered customer, and therefore automatically processes a payment, or from a non-registered user, and responds to the customer in an alternative manner, would be a welcome change for a vendor and would create a streamlined user experience for customers.

SUMMARY

The system and methods described herein authenticates a customer for an e-commerce transaction through the use of bulk tokens. DKIM/SPF confirms the source of the outgoing server, thereby facilitating expanded functionality and more convenient use of the email payment gateway for customers. The e-commerce system may use bulk tokens and uses email targeted tokens and URL hyperlinks as secondary systems.

This system described herein may be accessible to vendors and customers to allow for a singular solution to the complexity of email checkout—while improving security mechanisms. The incoming email address from a purchase request may be used as the user identifier. An URL-targeted token may not be associated with a specific email address and may be forwarded and used by other members.

A method implemented in an e-commerce system to facilitate transactions between a customer and a vendor is disclosed herein. The method comprising receiving a request for a bulk token for use in an advertising campaign. Generating a bulk token, wherein the bulk token includes at least a type field and amount field, and does not include an email field. Transmitting the bulk token to a vendor server. Receiving a reply email, wherein the reply email includes the bulk token. Decoding the bulk token. The e-commerce system may further perform a Sender Policy Framework (SPF) and DomainKeys Identified Mail (DKIM) validation and process the transaction, on a condition that the SPF and DKIM validations are approved.

A method implemented in a vendor system for transactions between a customer and a vendor facilitated by an e-commerce system, is disclosed herein. The method including transmitting, by a transmitter, a request for a bulk token for use in an advertising campaign; receiving, by a receiver, the bulk token, wherein the bulk token includes at least a type field and amount field, and does not include an email field; transmitting, by a transmitter, a plurality of advertisement emails to a list of recipients, wherein the list of recipients includes registered and non-registered individuals, the advertisement emails including a mailto hyperlink that includes the bulk token; receiving, by the receiver, a notification message, wherein the notification message includes a confirmation that a transaction has been processed based on one of the transmitted plurality of advertisement emails; and executing an order for a customer in response to the received notification message.

BRIEF DESCRIPTION OF THE DRAWINGS

FIG. 4 shows an example response email generated by a customer using a mailto hyperlink;

FIG. 17 shows an example web page that may be used by a first individual may make a payment request from another individual;

FIG. 20 shows an example web page that may be used in connection with a web checkout as described in FIG. 19;

FIG. 22 is an example of a confirmation email message associated with the web checkout as described in FIGS. 19-21;

FIG. 23 shows an example web page for an embodiment where the e-commerce system is integrated with an email server.

DETAILED DESCRIPTION

When used herein, the term "email-targeted token" may refer to a token associated with a specific email address.

When used herein, the term "URL-targeted token" may refer to token not associated with a specific email address and that may be forwarded and used by other members. URL-targeted tokens may be forwarded between individuals, it may be used by any member, and there is a built-in path for nonmembers to be directed to a URL at which they may complete a transaction.

The methods and system described herein may be configured to shift the identification from using an email address embedded within the outgoing offer email to an email address verified with a SPF and DKIM. The methods and system described herein may allow for a single email token to be used for any number of recipients.

The methods and system described herein may allow for one email token to be used for both registered and non-registered users, which may reduce or eliminate the need for segmentation of lists before sending campaigns.

An email payment gateway may enable vendors to email customers. Those customers may register with the e-commerce system, thereby allowing the vendor and the customers to perform transactions via the email payment gateway. Customers that are not yet registered may receive a separate email with URL web links that drive them to a "signup page", which permits the customers to enter the information necessary to become registered customers. In this scenario, registered customers receive emails with mailto hyperlinks allowing checkout by email. These mailto hyperlinks may be associated with products or services offered by the vendor. When the mailto hyperlink is selected, a customer device may then automatically generate a confirmation email that includes an email targeted token. To confirm the payment, this response email is sent to the e-commerce system where the email may be authenticated and the token decoded. These tokens may identify the customer via a customer email address embedded in the token. In one example, a token may be associated with the recipient email and the confirmation may compare the email address associated with the reply with an email embedded or associated with the received token.

As described in greater detail hereafter, the e-commerce system may be able to use "sharable" tokens; that is, tokens that may be shared among multiple potential customers. In this scenario, vendors may use these sharable tokens for their offers. These shareable tokens (e.g. bulk tokens) may be forwarded along to other individuals who may use the token to purchase goods. In this scenario, the token may not be targeted to an email address of the recipient. These sharable tokens are included in the offers, and the response emails from the customer(s) are authenticated through a check of DKIM-SPF.

Figure 1:
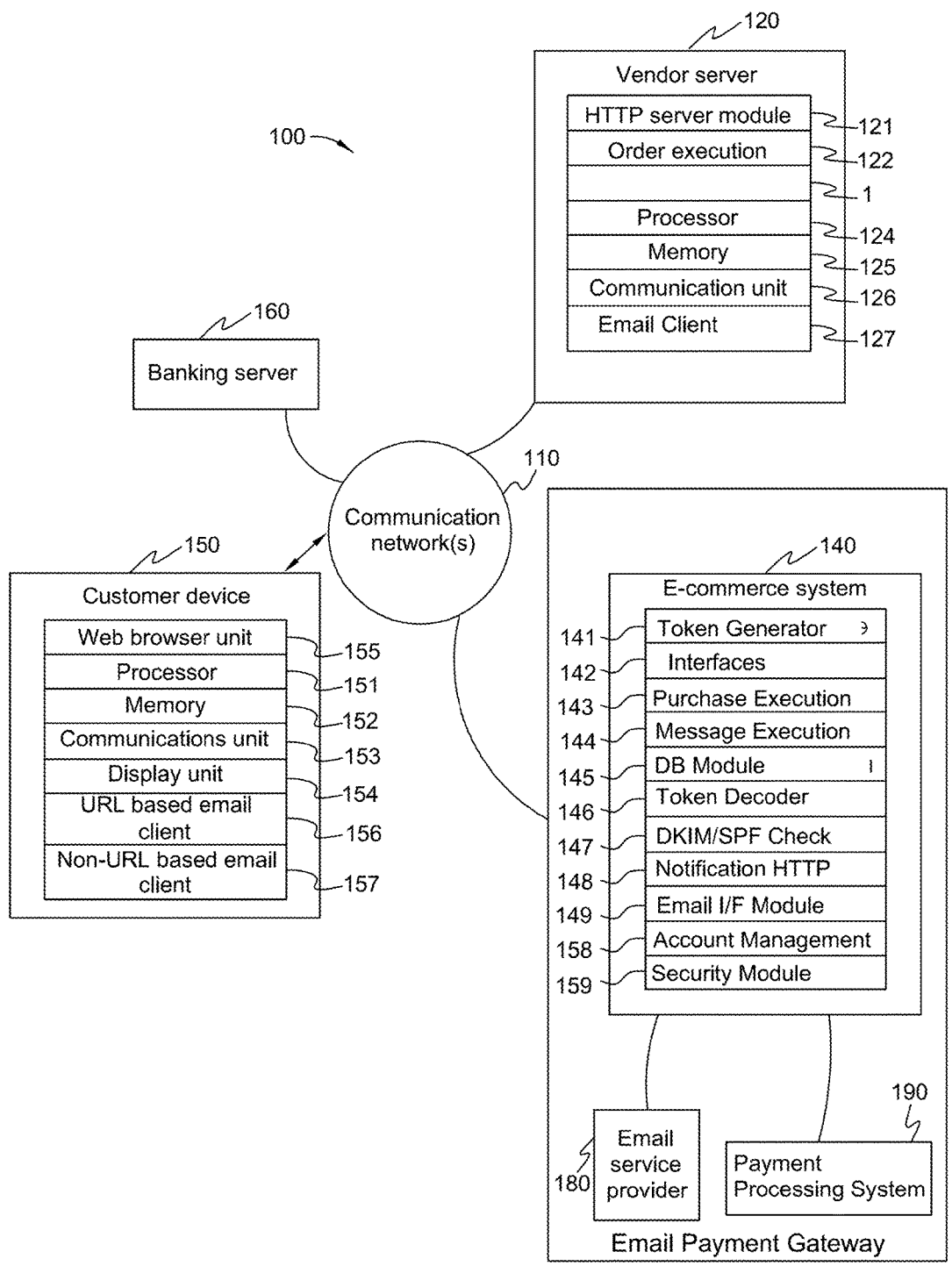
FIG. 1 is a diagram of an e-commerce system in accordance with an embodiment.

FIG. 1 shows an example system 100 that may be used for e-commerce transactions. The example system 100 includes a vendor server 120, an e-commerce system 140, a customer device 150, a banking server 160, an email service provider 180, and a payment processing system 190 that may communicate over one or more wired and/or wireless communication networks 110. The wired or wireless communication networks 110 may be public, private or a combination of public or private networks.

The customer device 150 may be, for example, a cellular phone, a smartphone, a desktop computer, a laptop computer, a tablet computer, or any other appropriate computing device. The customer device 150 includes a processor 151, memory 152, a communications unit 153, a display unit 154, a web browser unit 155 that may communicate data to/from the web server module(s) in the vendor server 120 and e-commerce system 140, an URL based email client 156, and a non-URL based email client 157. The web browser unit 155 may include and/or communicate with one or more sub-modules that perform functionality such as rendering HTML (including but not limited to HTML5), rendering raster and/or vector graphics, executing JAVASCRIPT, and/or rendering multimedia content.

Alternatively or additionally, the web browser unit 155 may implement Rich Internet Application (RIA) and/or multimedia technologies such as ADOBE FLASH and/or other technologies compatible with Internet based communications. The web browser unit 155 may implement RIA and/or multimedia technologies using one or web browser plug-in modules (e.g., ADOBE FLASH), and/or using one or more sub-modules within the web browser unit 155 itself. The web browser unit 155 may display data on one or more display devices that are included in, or connected to, the customer device 150, such as a liquid crystal display (LCD) display or monitor. The customer device 150 may receive input from the user of the customer device 150 from input devices (not depicted) that are included in, or connected to, the customer device 150, such as a keyboard, a mouse, a microphone or a touch screen, and provide data that indicates the input to the web browser unit 155.

The vendor server 120 may include an HTTP server module 121, an order execution unit 122, a processor 124, memory 125, a communications unit 126, and an email client 127.

The HTTP server module 121 provides a website that may be accessed by a customer device 150. The HTTP server module 121 may implement the HTTP protocol, and may communicate Hypertext Markup Language (HTML) pages and related data from the website to/from the customer device 150 using HTTP. The vendor server 120 may be connected to one or more private or public networks (such as the Internet), via which the HTTP server module 121 communicates with devices such as the customer device 150. The HTTP server module 121 may generate one or more web pages and may communicate the web pages to the customer device 150, and may receive responsive information from the customer device 150.

The HTTP server module 121 may be, for example, an NGINX server, an APACHE HTTP server, a SUN-ONE Web Server, a MICROSOFT INTERNET Information Services (IIS) server, and/or may be based on any other appropriate HTTP server technology. The vendor server 120 may also include one or more additional components or modules (not depicted), such as one or more load balancers, firewall devices, routers, switches, and devices that handle power backup and data redundancy.

The order execution unit 122 is configured to receive instructions from received messages and executes orders on behalf of the vendor server 1220.

The memory 125 may be configured to store information associated with e-commerce transactions. This may include inventory information, information used to generate web pages, customer information, and other e-commerce data.

The communications unit 126 may be configured to transmit/receive communications via the communication network 110 or other inputs/outputs.

The email client 127 may access and manage the vendor's email.

The e-commerce system 140 may include a token generator 141, an interfaces module 142, a purchase execution module 143, a message execution module 144, a database module 145, a token decoder 146, a DKIM/SPF Check module 147, a notification HTTP module 148, an email interface module 149, an account management unit 158 and a security module 159. While only one vendor server 120 is shown communicating with the e-commerce system 140, this is shown as an example only. The e-commerce system 140 may communicate with an internal or external email service provider 180 and an internal or external payment processing system 190. The E-commerce system 140 may communicate with multiple vendor servers 120. Similarly, vendors may register with the e-commerce system 140. The e-commerce system 140 may provide the vendor server 120 with a public key and private key to be used in token transaction in accordance with the methods described herein. When a transaction is attempted (e.g. for invoices and payments), the e-commerce system 140 decodes the token, authenticates the sender of the email, which may allow the transaction to be processed. While the e-commerce system 140 is depicted as a separate entity in FIG. 1, this is shown as an example only. The e-commerce system 140 may be controlled and/or co-located with the vendor server 120, and/or the email service provider 180.

The token generator 141 may generate tokens for use in e-commerce transactions. Tokens may be encrypted or plain text strings which contain information to perform a transaction when sent to the e-commerce system(s) 140. A token may be one or multiple encrypted strings, files, passwords, cyphers, plain text or other data which may contain information used to perform or authenticate a transaction. While FIG. 1 shows the token generator 141 as being a part of the e-commerce system, it may be hosted by any trusted party with access to the private key. For example, the banking server 160 may include a token generator 141. A token may include one or more of the following parameters or other parameters not listed below:
  a) private-key: The private key provided by the e-commerce system 140.
  b) public-key: e-commerce system's 140 public key, provided by the e-commerce system 140.
  c) partner-id: The partner ID given provided by the e-commerce system 140.
  d) environment: The environment the vendor wants to generate buttons for. This distinguishes whether the token is being used in a testing environment or in the live environment (and running real transactions).
  e) config: The path to a configuration file in yml format. This may hold a default set of information, e.g., private_key, public_key, partner_id, and other information—so they don't have to be entered separately each time a token is generated. The configure field may also contain information specific to an offer or a customer if multiple tokens are being generated with similar components.
  f) type: The type of token to generate (e.g. bulk, email-targeted, etc.). There are multiple types of tokens that a token generator may generate and decode. For example, site tokens may be used for website transactions, email tokens for two-click email payments, and universal tokens for email validations.

g) card: The card token associated with the recipient of this token. When a customer is registered with the e-commerce system 140, the vendor receives a credit card token—a unique identifier that references the specific card associated with that customer and vendor. When the vendor is generating a token to submit to e-commerce system 140, they may include the card token as a customer identifier.

h) email: The email associated with the receipt of this token.

i) URL: The Signup URL the recipient should go to if customer doesn't have payment information registered with e-commerce system 140.

j) amount: The amount a user should be charged for the transaction the token is generated for.

k) user-data: Data to pass back as a reference. This data may include custom data that the vendor may want to pass through the e-commerce system 140 and receive back when a transaction has completed. It may include an item reference number or SKU, customer address, or other piece of data that is not required by e-commerce system 140 to complete a transaction, but that the vendor wants associated with that transaction.

l) expires: Expiration date for token, integer value of seconds since epoch.

m) header-user-agent: The HTTP_USER_AGENT from the request header. HTTP headers are sent as part of a request from a customer's web browser unit 155 for a piece of information. These headers define the parameters that the web browser unit 155 is expecting to get back. The user-agent is the identifier of the software that is submitting the request—typically the identifier of the web browser unit 155 that is requesting the content.

n) header-accept-language: The HTTP_ACCEPT_LANGUAGE from the request header. The accept-language is the acceptable language for the response—e.g. the language in which the web browser unit 155 is requesting the content be sent back.

o) header-accept-charset: The HTTP_ACCEPT_CHARSET from the request header. The accept-charset is the character sets that are acceptable for the response—e.g. the character set in which the web browser unit 155 is requesting the content be sent back.

p) ip-address: The IP address of the token recipient.

In one example, a bulk token may omit the card and email fields, allowing for the tokens to be shared. Additionally, or alternatively, a bulk token may include the card field and/or email field but the e-commerce system 140 may be configured to ignore those fields and/or other fields based on the type field.

The interfaces module 142 serves as an interface to databases within the e-commerce system 140.

The purchase execution module 143 facilitates the execution of purchases between a customer and a vendor.

The message execution module 144 is configured to analyze received messages and communicate with the token decoder 146 to determine if the received message is valid and to identify the request embedded in the message (e.g. request for purchase of goods.) If the token decoder 146 indicates the token is valid, the message execution module 144 may then access the account management unit 158 to verify a transaction.

The database module 145 serves as a database to store information that may be accessed by the e-commerce system 140.

The token decoder 146 may be configured to decode tokens received from external sources, such as a vendor server 120 or a customer device 150.

The DomainKeys Identified Mail (DKIM)/Sender Policy Framework (SPF) check module 147 serves to authenticate received emails, using DKIM and/or SPF protocols. For example, SPF allows a domain owner to add a file or record on the server that the recipient server cross-checks. Similarly DKIM may be used to embed information within the email.

The notification HTTP module 148 delivers notices of events to external systems, such as an HTTP endpoint the vendor configures to update their internal database when a transaction is executed.

An email interface module 149 may be configured to parse emails for action by the e-commerce system.

The account management unit 158 is configured to manage accounts registered with the e-commerce system 140. A customer or vendor, wishing to complete a transaction with an e-commerce system 140 may register his/her email address and payment information with the e-commerce system 140. The account management unit 158 may be configured to store a customer registry and vendor registry.

The security module 159 may be configured to perform additional security measures to prevent unauthorized access to the system or fraud.

The email service provider (ESP) 180 may be associated with the vendor server 120, the e-commerce system 140, or may be a third party entity. The email service provider 180 may be configured to provide email marketing services. The email service provider 180 may further be configured to provide tracking information showing the status of email sent to each member of an address list. The email service provider 180 may further be configured to segment an address list into interest groups or categories to send targeted information. The email service provider 180 may also parse messages based on the secondary system of email targeted tokens. The ESP 180 may also be configured to send trigger emails based on responses from the vendor or customer behavior. The email service provider 180 may further be configured to create or use templates generated by the e-commerce system 140 for sending to contacts and/or the use of templates pre-made, email service provider 180 may include a user interface that allows a user to manually adjust the template or it may be integrated with external sources (e.g. vendor server 120 or e-commerce system 140). The email service provider 180 may comprise a send engine, which allows vendors to distribute their message to the customers. The ESP 180 may further include a tool for generating mailto hyperlinks, graphic buttons, and tokens. The email service provider 180 may be configured to customize dynamically the content of emails that are sent out, to tailor personalized information and mailto hyperlinks.

The banking server 160 may be controlled by a third party system bank. The e-commerce system 140 may communicate with the banking server 160 to verify that the customer has adequate funds or credit for the requested purchase. For example, the banking server 160 may be a controlled by VISA, AMERICAN EXPRESS, MASTERCARD or any other bank or banking or financial network that a customer may use for online payment. The banking server 160 may be may be an interface for a centralized or decentralized virtual currency system or protocol such as frequent flyer miles, "reward" points, or Bitcoin.

The email-based e-commerce system 140 may allow vendors to send advertising emails with a mailto-hyperlink associated with a specific product offer and select the mailto-hyperlink and generate a response email by selecting the mailto-hyperlink. This response email contains a token and is addressed to the e-commerce system 140. Once sent, this response email confirms the customer's purchase of the product by parsing the information in the token. The e-commerce system 140 processes the payment and notifies the vendor and the customer. The e-commerce system 140 may comprises a token generator, components for processing the tokens and a components for processing the payments and a system for notifying the vendor server 120 of the transaction details.

Referring back to the example system in FIG. 1, the payment processing system 190 may be an independent third party operated unit, it may be located in the e-commerce system 140 or the vendor server 120.

While the example system shown in FIG. 1 shows the e-commerce system 140 comprising the token generator 141, this is shown as an example only. The vendor server 120 may also include a token generator that allows vendors to directly create tokens. In another example, a third party may have a token generator to create tokens for use by the vendor server 120.

Figure 2:
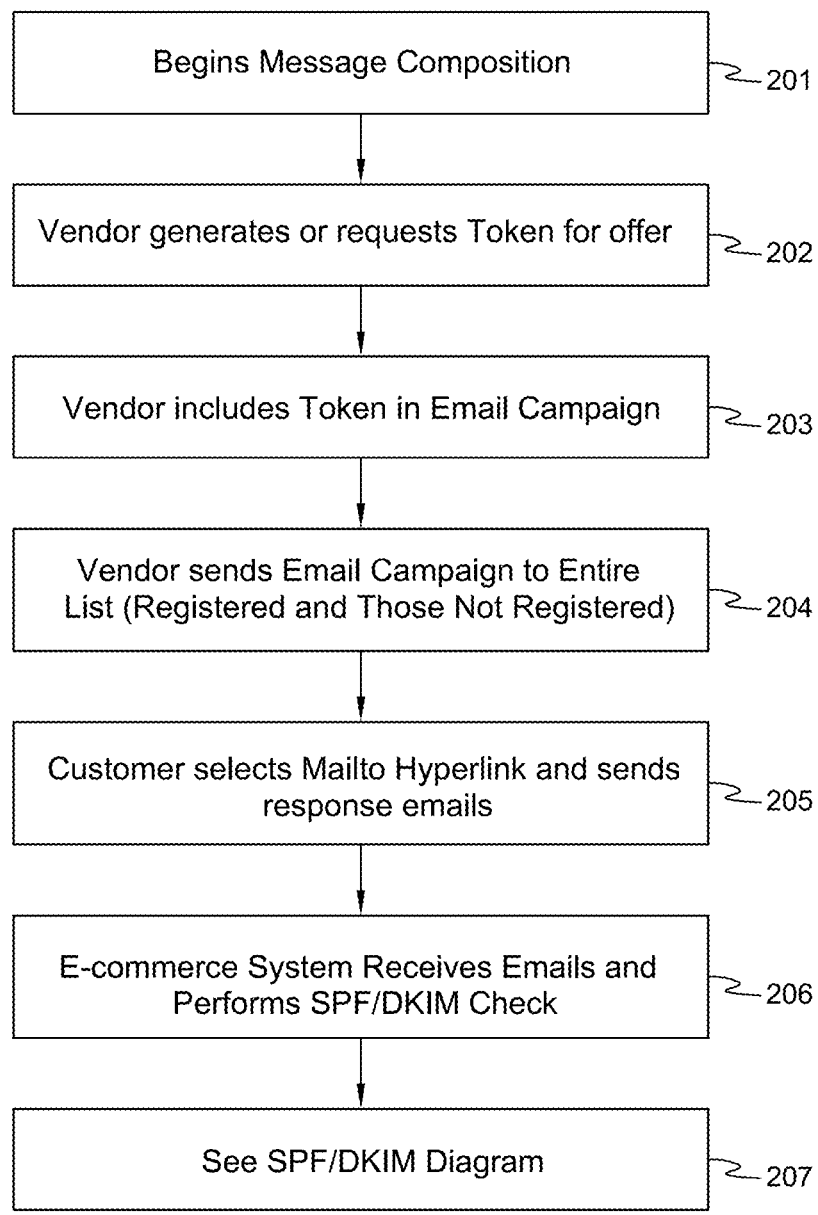
FIG. 2 is the initial steps in an email campaign before they reach the DKIM/SPF.

FIG. 2 is a flow diagram showing initial steps for an email campaign, which may comprises one or more emails to be sent to one or more recipients. This email campaign may be for a product, service, donation or invoicing. A vendor, using the vendor server 120 may compose an email advertisement or solicitation (step 201). The vendor may request, from the e-commerce system 140, tokens to be used for an offer or the vendor may generate these tokens (step 202). This may be, for example a "bulk token" which allows the e-commerce system 140 to determine how to collect payment information. An example of a bulk token is a URL targeted token, which directs a user to an URL embedded in the token. This request may be transmitted via an online interface, or generated with a system embedded within the vendor server.

The vendor server 120 may receive these tokens and integrate them into each of the emails associated with the email campaign, for example, using a button with a mailto hyperlink that includes the token (step 203). The email may include multiple products/offers; each product or offer may be associated with an embedded mailto hyperlink, or may be included as a group within one mailto hyperlink. These mailto hyperlinks may wrap, be contained or be referenced by an image such as a button depending on the receiving email client. The vendor server 120 may then send out each of the emails, including the bulk tokens, in the email campaign to the intended recipients (step 204). This list need not be segmented; registered and non-registered users get the same email.

A customer, using a customer device 150 may select a mailto hyperlink embedded in the emails, this will automatically generate a response email, that may be sent using the customer device 150 (step 205). The response email may include the bulk token and be addressed to the e-commerce system 140. As described above, the token is located in the body field, however, this is as an example only, and the token may be located in other fields of the email. To the customer, the target address of the response email may appear to be directed to the vendor server 120, however, it may be directed to the e-commerce system 140. The location of the e-commerce system may be contained in a third party such as an email service provider, email client or hosting entity. The e-commerce system 140 may receive the response email and perform a DKIM/SPF check to authenticate the sender of the email (step 206). Based on the result of the DKIM/SPF check, the e-commerce system may continue processing the email (step 207).

Figure 3:
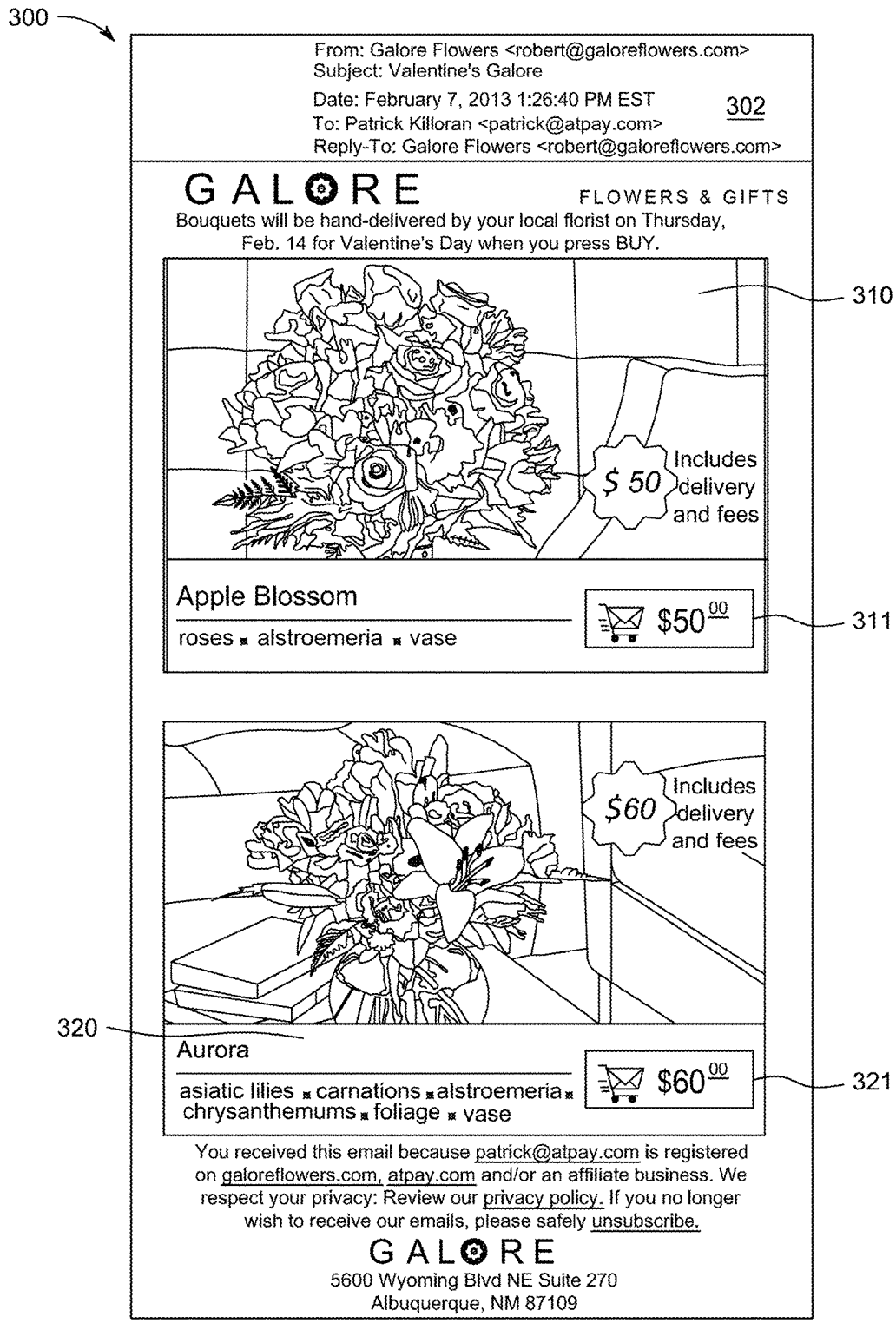
FIG. 3 shows an example advertisement email generated by a vendor server using an API.

FIG. 3 shows an example advertisement email generated by a vendor server 120 using an API. The API allows a vendor to request payment buttons 311 and 321 for inclusion in an HTML formatted email message 300. As shown in FIG. 3, the email message 300 includes an email header 302 which includes "from", "subject", "date", "to" and "reply-to" fields. The email includes two offers, an offer for an apple blossom 310 and an offer for an aurora 320. Each offer has an associated payment button 311 and 321. Payment buttons 311 and 321 may each be embedded with a hyperlink that includes a token, e.g. a bulk token. The token may include information identifying the product and purchase price of the offer it is associated with. By selecting pay button 311 or 321 an email client associated with the customer device 150 may generate a response email that is addressed to the e-commerce system 140. The response email may include information allowing the e-commerce system 140 to complete the transaction, including a token and information from the email header 302.

FIG. 4 shows an example response email 400 generated by a customer using a mailto hyperlink. As shown in FIG. 4, the response email 400 may include a plurality of fields. This may include a "to" field 401, a carbon copy or cc field 402, a blind carbon copy or bcc field 403, a subject field 404, a from field 405, and a body field 406. These are only the visible fields; the email may further include other fields, such as headers that are not visible. As shown in the example, the token 407 is embedded in the body field 406 of the response email 400. This is as an example only. Further, while the token 407 is shown as a text string, it may also be an image, a sound, or other file associated with the response email 400.

Figure 5:
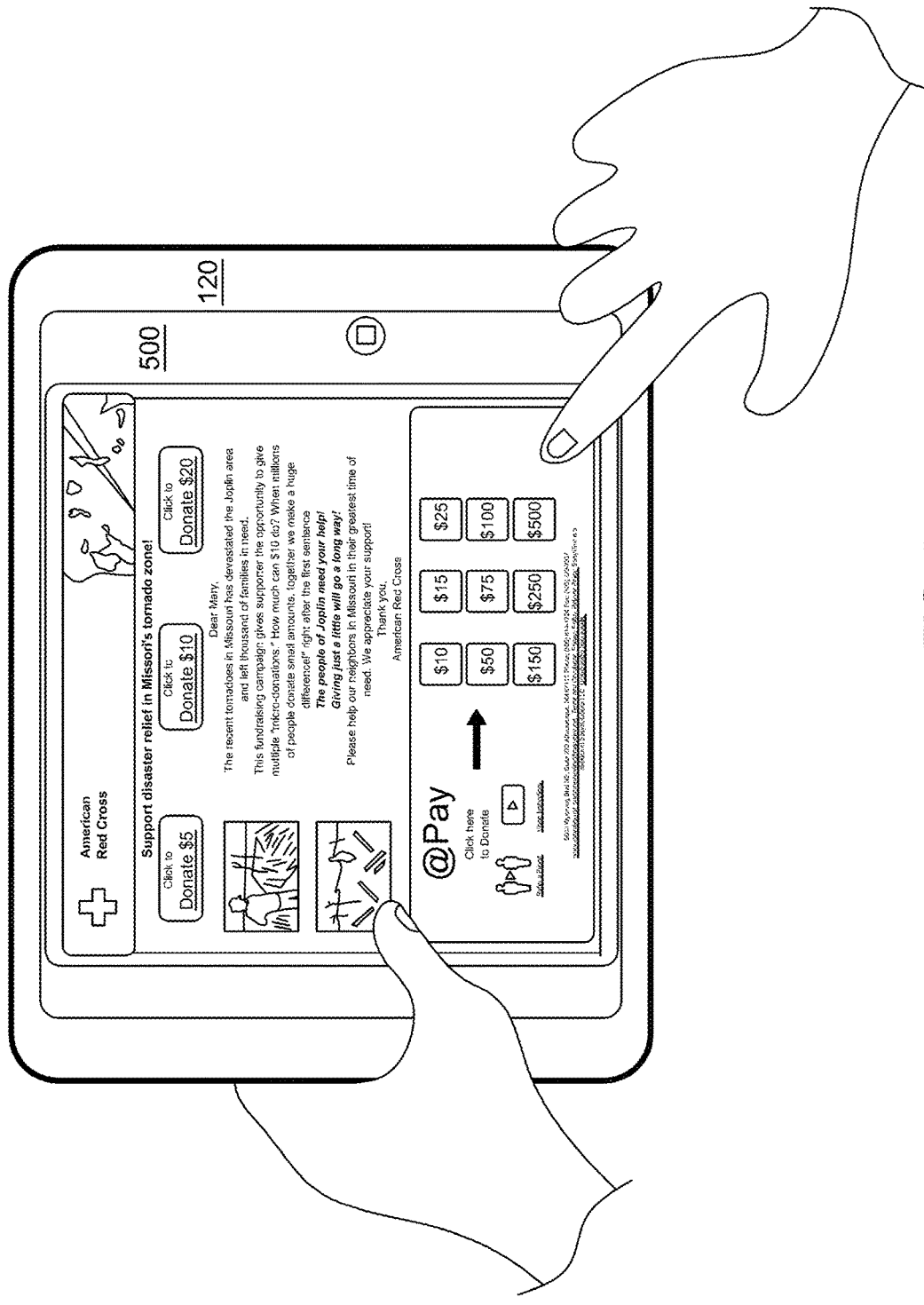
FIG. 5 shows an example wherein the customer device is a tablet that has received an advertisement email.

FIG. 5 shows an example wherein the customer device 150 is a tablet that has received a donation request email 500. As shown in the FIG. 5, there is an input area 510 with multiple buttons soliciting for one of a plurality of donation amounts. Each one of the buttons in input area 510 is associated with a different mailto hyperlink. By selecting a button in input area 510, the user can select the amount to donate.

Figure 6:
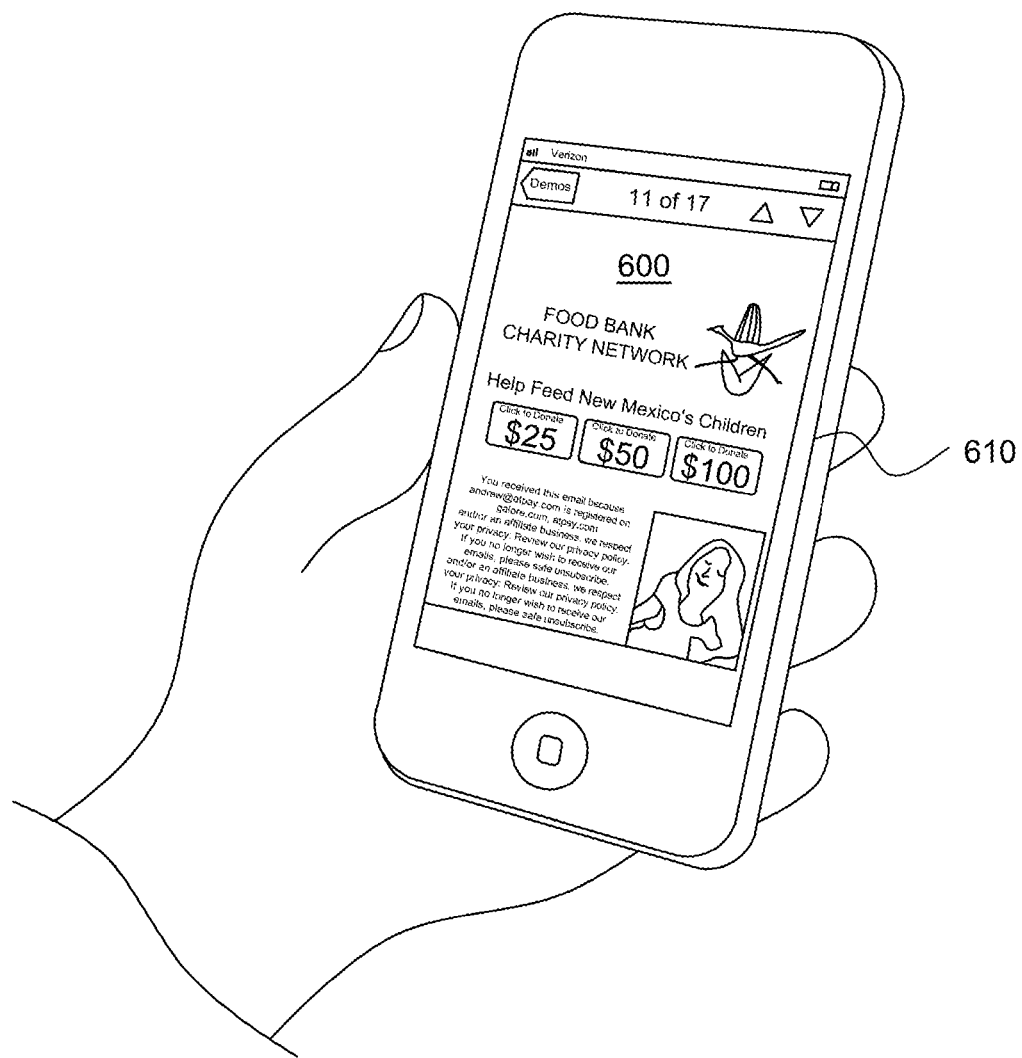
FIG. 6 shows an example wherein the customer device is a mobile phone that has received a donation request email.

FIG. 6 shows an example wherein the customer device 150 is a mobile phone that has received a donation request email 600. As shown in the FIG. 6, there is an input area 610 with multiple buttons soliciting for one of a plurality of donation amounts. Each one of the buttons in input area 610 is associated with a different mailto hyperlink. By selecting a button in input area 610, the user can select the amount to donate.

Figure 7:
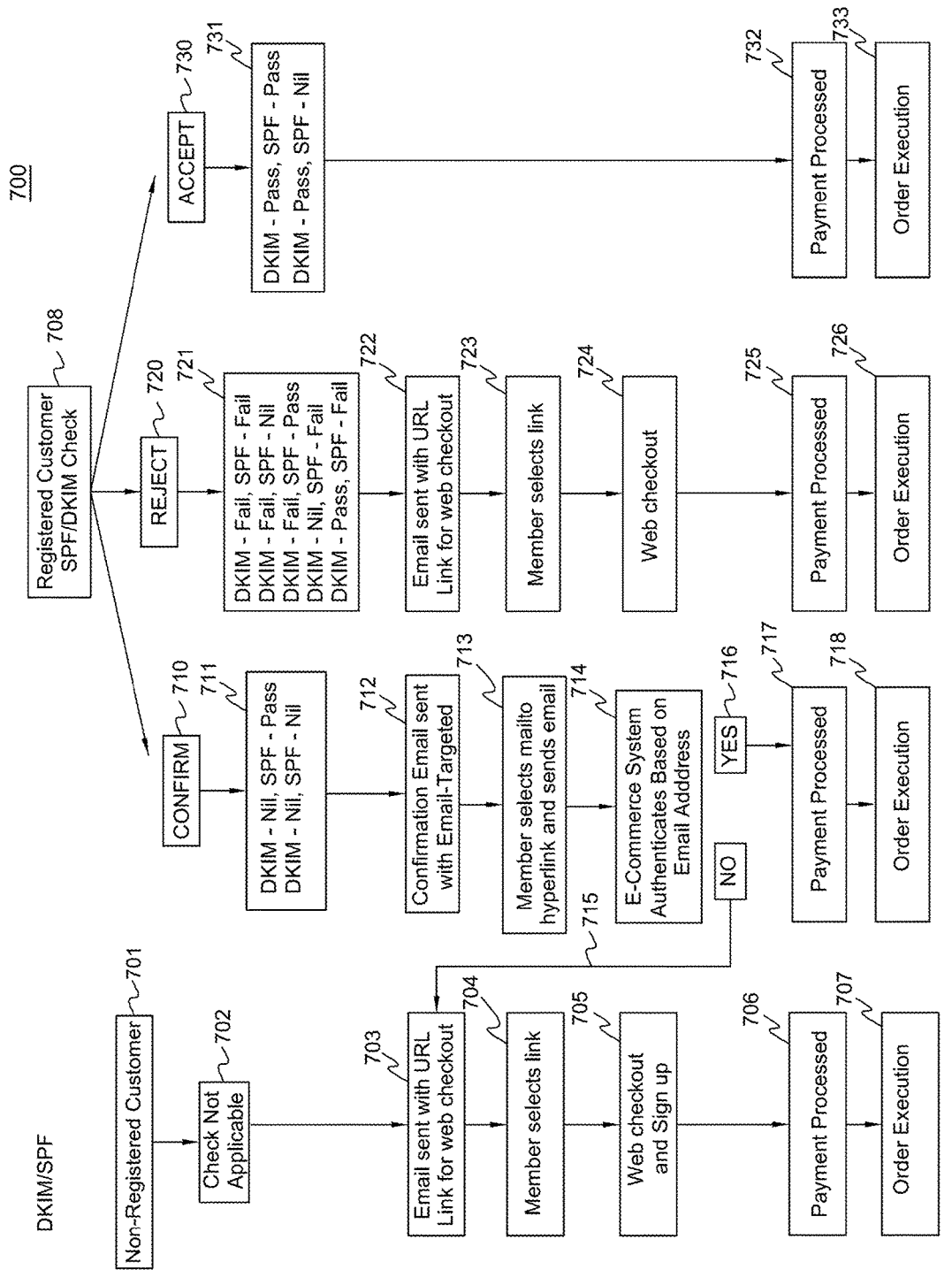
FIG. 7 is flow diagram of an e-commerce system authenticating received emails from registered and non-registered customers.

FIG. 7 is flow diagram of an e-commerce system 140 authenticating received emails from registered and non-registered customers. An email campaign may be directed at any combination of consumers who have registered payment information with the e-commerce system and consumers who have not registered payment information with the e-commerce system. When the e-commerce system 140 receives a response email, it must determine whether the response is from a non-registered customer or a registered customer, this may be based, for example, on the email address associated with the sender of the email. Once the e-commerce system 140 has determined whether the email was sent from a registered or non-registered customer, the e-commerce system may determine whether the email was received from an authenticated source.

Whether or not the DKIM and SPF validations succeed, the e-commerce system 140 may determine that an email is received from a non-registered customer (step 701). This may be based on, for example, the email address of the customer or information embedded in the email including the token. If this is the case, the e-commerce system 140 may determine that an SPF/DKIM check is not applicable (step 702). The e-commerce system 140 may send an email to the non-registered customer with an URL hyperlink for a web checkout (step 703). The non-registered customer may select the URL hyperlink in the email which directs the non-registered customer to a webpage based on the URL (step 704). The non-registered customer may then complete a web checkout on the webpage (step 705). By completing the web checkout, the non-registered customer may be registered with the e-commerce system 140, either automatically or by selecting an option. The payment may then be process (step 706). And the order or donation may be executed (step 707).

The e-commerce system 140 performs an SPF/DKIM check on the email, to check for valid DKIM signatures and SPF records (step 708). These are used to detect whether incoming messages have been mimicked. A mimicked message may be an email message that appears to have been sent by a user, but was sent by another user. This may often be seen in spam messages appearing to be from a known source. Based on the authentication procedure, the e-commerce system 140 may confirm, reject, or accept the authentication.

In one scenario, after the SPF/DKIM check, the e-commerce system 140 may determine that a confirmation of the sender is needed (step 710). The confirmation may be requested, for example, based on user preferences, or if the e-commerce system 140 requests additional information. The e-commerce system may determine a confirmation is needed when the DKIM is Undefined and the SPF is either Pass or Undefined (step 711). In this scenario, the e-commerce system 140 may generate a confirmation email message that includes a mailto hyperlink with an email targeted token to confirm the identity via an email message (step 712). In this instance, the email targeted token may be integrated as a secondary system for a two-click experience within the email client. When the customer receives the email, they select the hyperlink and generate a response email that they send back to the e-commerce system (step 713). When the e-commerce system 140 receives the response to the confirmation email message the e-commerce system 104 authenticates the customer, based on the email address this message was sent from and the email address embedded within the email-targeted token (step 714). If this is confirmed as a YES (step 716) then the e-commerce system 140 may decode the token and processes the payment and send notifications to the customer and vendor server (step 717). The e-commerce system 140 may then execute the order (step 718). If the email targeted token arrives back at the e-commerce system 140 and is not recognized as a registered and confirmed as a NO (step 715), then the e-commerce system may send the customer an email with a URL hyperlink driving them to a signup and web checkout page. This web checkout may be located on the e-commerce system 140 or integrated with an API on the vendor server 120 or it may be on a third party system.

Figure 11:
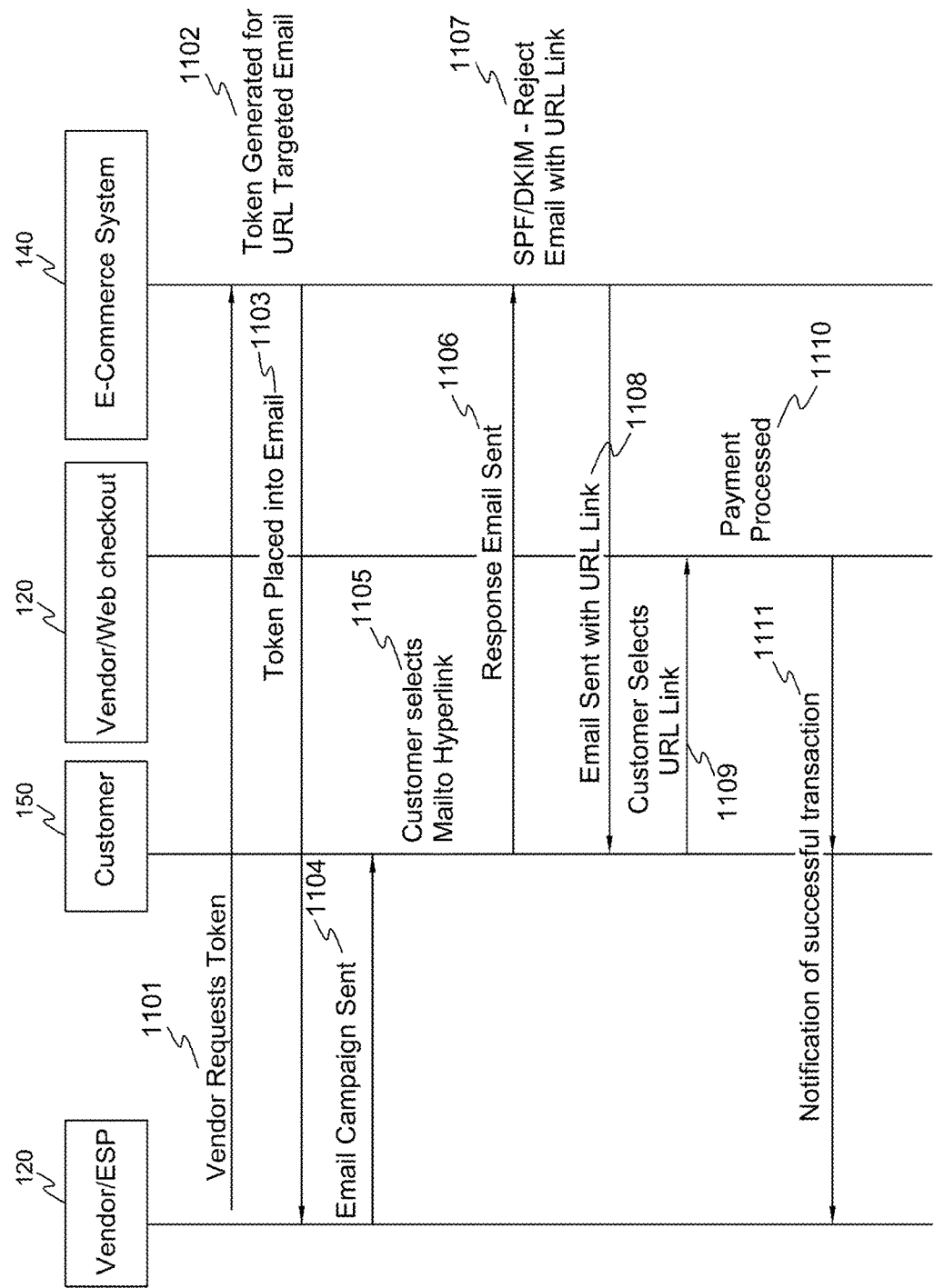
FIG. 11 is a transactional flow diagram for an e-commerce transaction where the response is categorized as Reject.

In another scenario, the e-commerce system 140 may reject the email (step 720). This may occur when the DKIM Fails and the SPF either comes up Failed, Undefined or Passes OR the SPF Fails and the DKIM is Undefined or Pass (step 721). In this situation, the e-commerce system 140 may not confirm the outgoing email server of the received email message. The e-commerce system 140 may generate a response email addressed to the customer that includes a URL hyperlink for the messages categorized as Reject (step 722). (FIG. 11). When this URL hyperlink is selected (step 723) the customer opens a web-based checkout page and uses the URL to complete a web checkout (step 724). This web checkout maybe part of the vendor server 120 or hosted by the e-commerce system 140. The web checkout may also request the user to enter registration information. Once the web checkout is complete, the payment may be processed and the order executed (steps 725 and 726).

In the third scenario, the e-commerce system 140 accepts the response (step 730) email and is able to successfully authenticate a registered user. For example, this may occur when the vendor server 120 generates an email and requests a bulk token from the e-commerce system and embeds it in a mailto hyperlink in the advertising email. Each mailto hyperlink is associated with an offer. The email is sent to the list of customers. When a customer activates the mailto hyperlink a response email is generated with the bulk token and that email is addressed to the email e-commerce system 140. The customer sends the response email. Once the email is sent the DKIM/SPF process begins. If the e-commerce system 140 determines that the received email is from a registered customer and both the DKIM and SPF are present and valid, the received message may be categorized and processed as an Accept by the e-commerce system 140 (step 731). The token is decoded and the customer's payment processed (step 732) and then the order is executed (step 733).

In an alternative embodiment where any customer sending a message that is categorized as either Non-registered, Confirm or a Reject may all receive an email response that drives them to a URL. This may be a preference of the vendor or may be in response to other environmental indicators such as the rate of Confirmations, Rejections and Acceptances the system is currently detecting.

Figure 8:
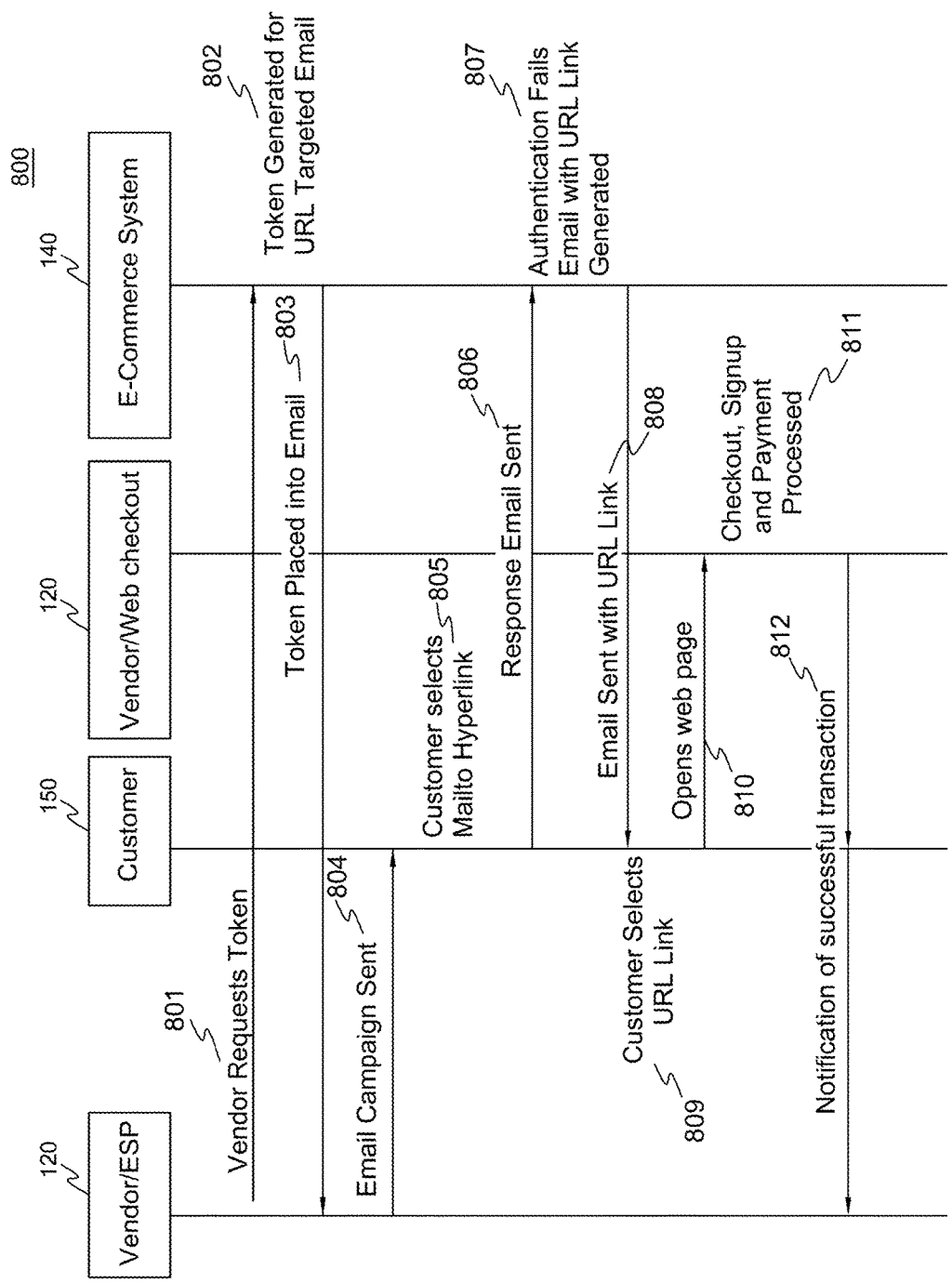
FIG. 8 is a transactional diagram of an e-commerce system processing non-registered customers.

FIG. 8 is a transactional diagram of an e-commerce system 140 processing non-registered customers. A vendor server 120 (or an email service provider associated with the vendor server 120) may request tokens to be used for an email campaign (step 801). The e-commerce system 140 may generate bulk tokens for an email campaign (step 802). These tokens may be transmitted to the vendor server 120 or ESP to place the tokens into the emails associated with the email campaign (step 803). The vendor server 120 may transmit the emails associated with the email campaign to one or more customer email addresses (step 804).

A customer, using a customer device may select a mailto hyperlink embedded in the email (step 805). This will automatically generate a response email that includes a token. The customer may then send this response email to the e-commerce system (step 806). If the user is a non-registered user, the authentication may fail. The e-commerce system 140 may then generate an email with an URL hyperlink (step 807). The e-commerce system 140 may send this email to the email address from which the previous response email was received (step 808). The customer, using a customer device 150 may select the URL hyperlink embedded in the email (step 809). This may open a web page associated with the vendor server 120 (step 810). The customer, using the customer device 150 may then checkout and signup to be a registered user of the e-commerce system 140. The e-commerce system may then process the payment (step 811). After payment is processed, the e-commerce system 140 may notify the customer and/or vendor of the successful transaction (step 812).

FIGS. 9, 17, 20-23 show example web pages that may be displayed by a web browser unit associated with a customer device 150. As will be described in detail below, the web pages may include display elements which allow initiators and responders to complete peer to peer email based financial transactions utilizing one or more emails. The web pages may be included in a web browser window that is displayed and managed by the web browser unit 155. The web pages may include data received by the web browser unit 155 from the e-commerce system 140. The web pages may include payment transaction information.

The web browser window may include a control area that includes a back button, forward button, refresh button, home button, and address field. The control area may also include one or more additional control elements, such as bookmark page etc. An initiator or responder using a customer device 150 may select the control elements in the control area. The selection may be performed, for example, by clicking a mouse or providing input via keyboard, touch screen, and/or other type of input device. When one of the control elements is selected, the web browser unit 155 may perform an action that corresponds to the selected element. For example, when the refresh button is selected, the web browser unit 155 may refresh the page currently viewed in the web browser window.

Figure 9:
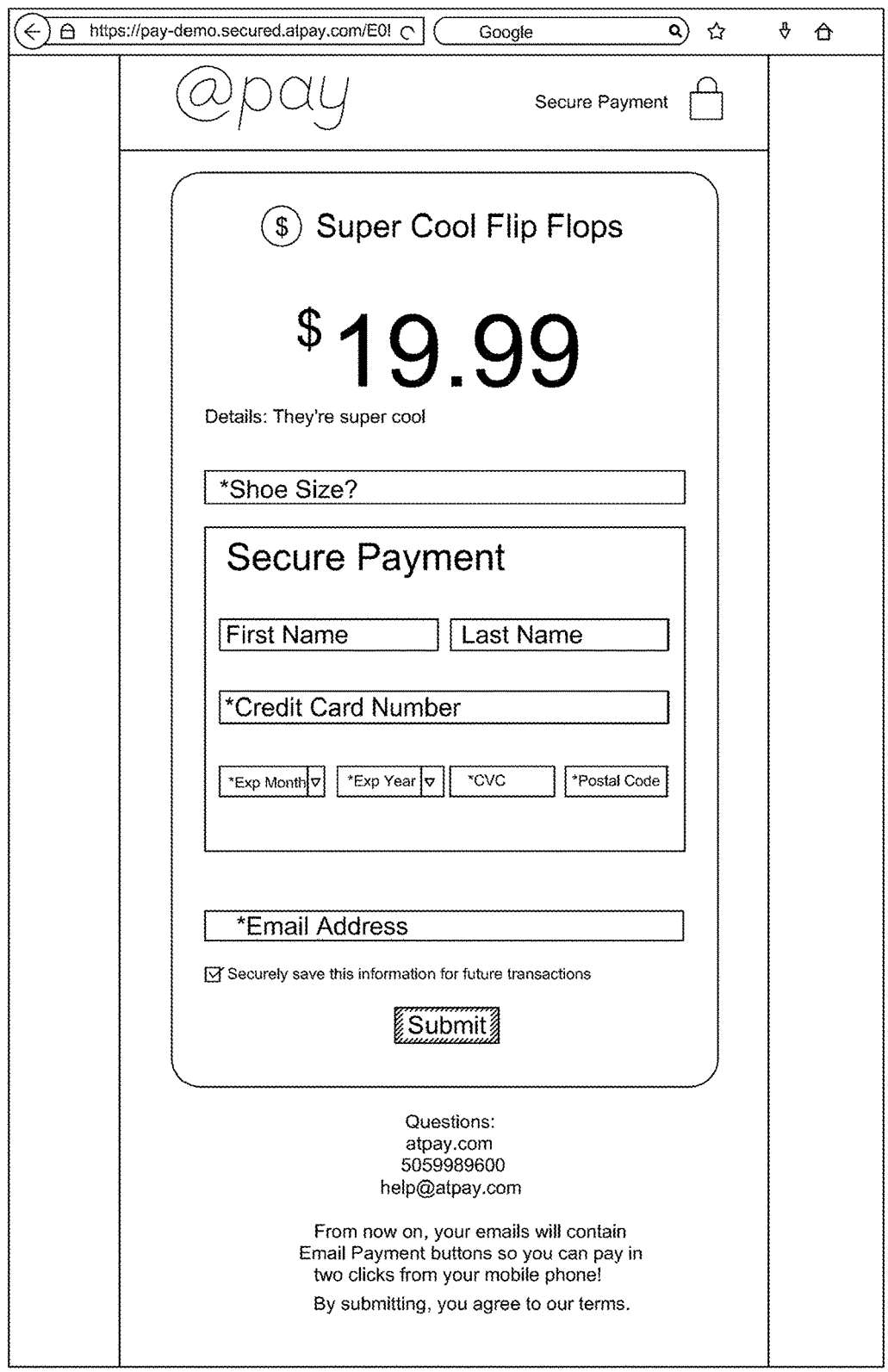
FIG. 9 is an example of web page accessed by a user to enter account and billing information.

FIG. 9 is an example of web page 900 accessed by a user to purchase an item and enter billing information. In one scenario, when a non-registered customer attempts to purchase an item, they may be directed to web page 900. As shown in FIG. 9, web page 900 may include an offer field 901, multiple input fields 902-910, and a submit button 911. As the customer device 150 receives inputs for the input fields 902-910, or the save settings button 911, the web browser unit 155 may store one or more data structures that reflect the selections made in the input fields. Further, as the selections are updated, the web browser unit 155 may update the web page 900 to indicate additional, or more specific, questions that may be associated with the selections. As shown in FIG. 9, web page 900 the customer is presented with an offer in offer field 901, in the scenario where the customer is non-registered, additional information may be needed. Input area 902 solicits show size information. Web page 900 solicits credit card information in input fields 902-909, this includes first and last name (on the credit card), card number, expiration date, security code, and phone number associated with the credit card. Web page 900 also solicits an email address from the customer in input field 910. When the user selects the submit button 911, if there are no errors in the transmission, the account information is stored by the e-commerce system 140 and the customer may be taken to a subsequent web page. Additionally, the e-commerce system 140 may receive the information and be able to process the transaction.

Figure 10:
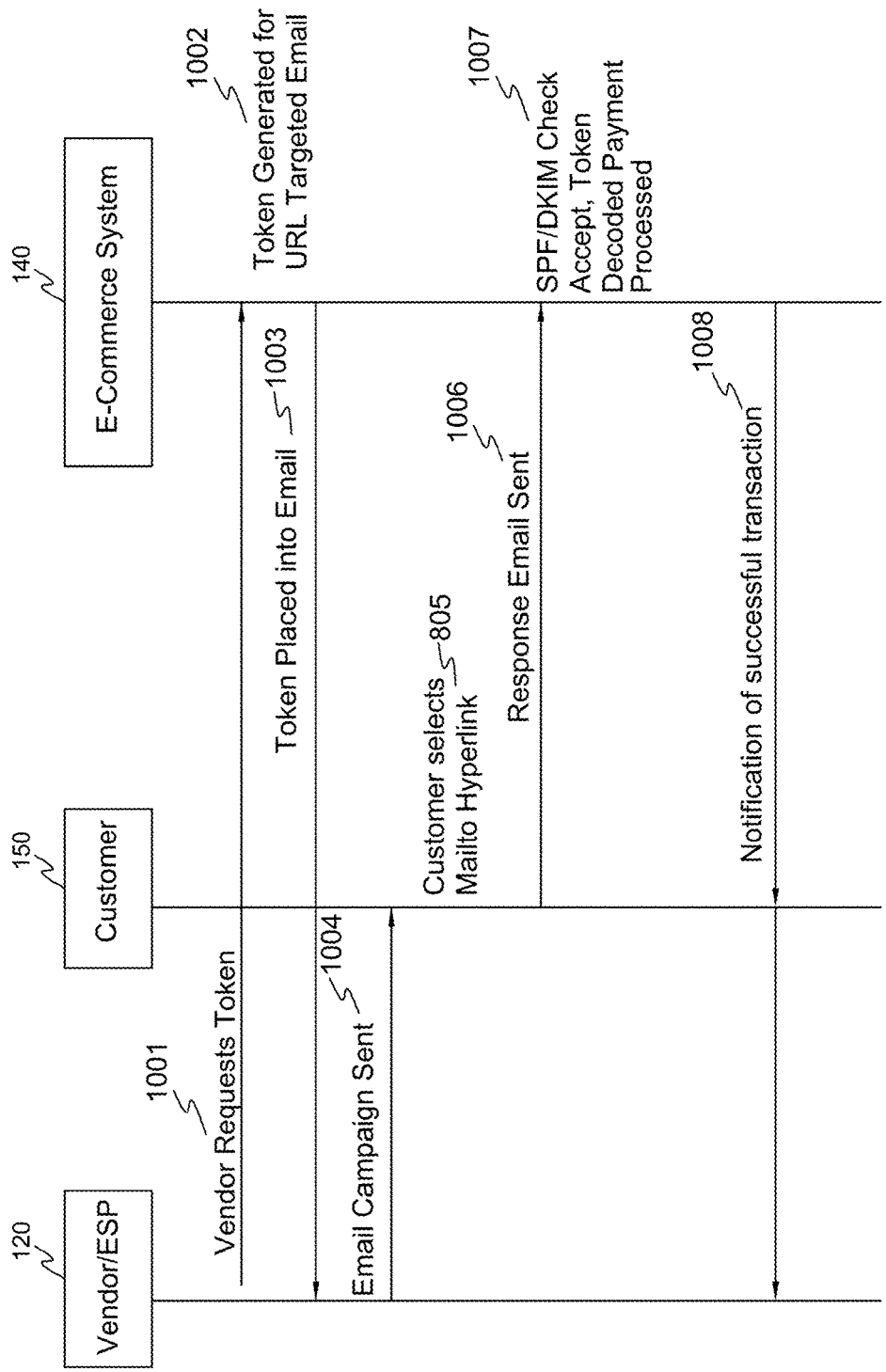
FIG. 10 is a transactional flow diagram for an e-commerce transaction where the response is categorized as Accept.

FIG. 10 is a transactional flow diagram for an e-commerce transaction where the response is categorized as Accept. As shown in FIG. 10, a vendor server 120 or an email service provider associated with a vendor may request a one or more tokens from the e-commerce system for an email campaign (step 1001). The e-commerce system 140 generates one or more tokens for an URL-targeted email (step 1002). The tokens may be sent to the vendor server 120 or email service provider and embedded into emails associated with an email campaign (step 1003). The vendor server 120 or email service provider may transmit the emails in the email campaign (step 1004). A user operating a customer device 150 may open the received email and select a mailto hyperlink (step 1005). The customer device 150 will automatically generate a response email in response to the selection of the mailto hyperlink and this email may be sent by the customer device 150 (step 1006). This response email includes a token and SPF/DKIM check information. The e-commerce system 140 may then perform the SPF/DKIM check and determine that the email is categorized as Accept. The e-commerce system 140 may further decode the token and process the payment (step 1007). Once the payment is processed, the e-commerce system 140 may notify the customer and/or vendor of a successful transaction, e.g. by transmitting an email, SMS or other electronic medium (step 1008).

FIG. 11 is a transactional flow diagram for an e-commerce transaction where the response is categorized as Reject. As shown in FIG. 11, a vendor server 120 or an email service provider associated with a vendor may request a one or more tokens from the e-commerce system for an email campaign (step 1101). The e-commerce system 140 generates one or more tokens for an URL-targeted email (step 1102). The tokens may be sent to the vendor server 120 or email service provider and embedded into emails associated with an email campaign (step 1103). The vendor server 120 or email service provider may transmit the emails in the email campaign (step 1104). A user operating a customer device 150 may open the received email and select a mailto hyperlink (step 1105). The customer device 150 will automatically generate a response email in response to the selection of the mailto hyperlink and this email may be sent by the customer device 150 (step 1106). This response email includes a token and SPF/DKIM check information. The e-commerce system 140 may then perform the SPF/DKIM check and determine that the email is categorized as Reject (step 1107). At this point, the e-commerce system may send an email to the customer with a URL hyperlink directing the customer to a vendor/web checkout (step 1108). The customer, using a customer device 150 may then select the URL hyperlink and access a website associated with the vendor server 120 (step 1109). While the description above is in reference to a single customer device 150, a user may receive and view a single email on multiple devices and multiple platforms. In one scenario, the customer may first view the email on a first customer device 150 and then later use another device to view the email and activate the mailto hyperlink. The e-commerce system 140 may process the payment (step 1110). Once the payment is processed, the e-commerce system 140 may notify the customer and/or vendor of a successful transaction, e.g. by transmitting an email, SMS or other electronic medium (step 1111).

Figure 12:
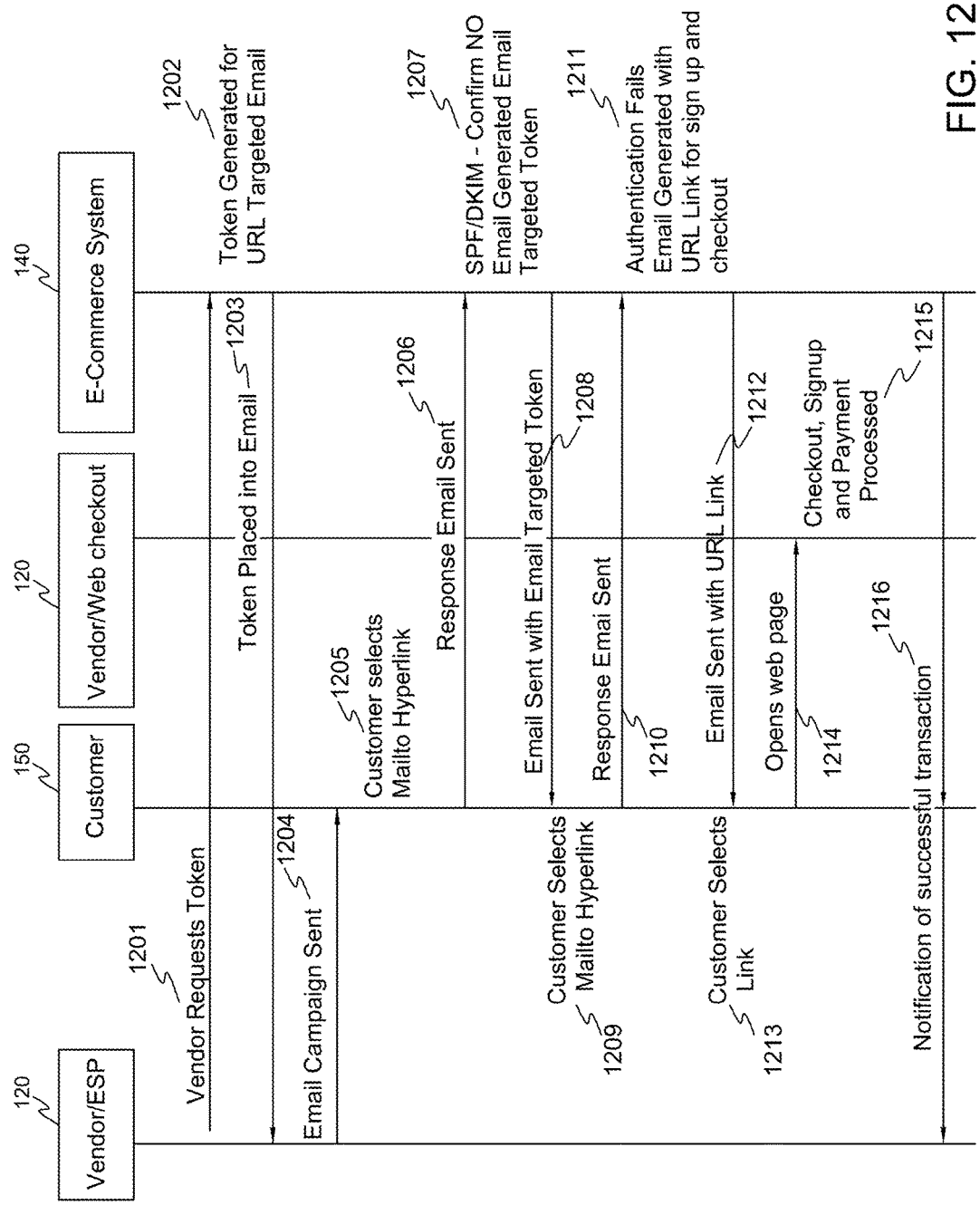
FIG. 12 is a transactional flow diagram for an e-commerce transaction where the response is categorized as Confirm and where the e-commerce system is unable to process the transaction via email.

FIG. 12 is a transactional flow diagram for an e-commerce transaction where the response is categorized as Confirm. As shown in FIG. 12, a vendor server 120 or an email service provider associated with a vendor may request a one or more tokens from the e-commerce system for an email campaign (step 1201). The e-commerce system 140 generates one or more tokens for an URL-targeted email (step 1202). The tokens may be sent to the vendor server 120 or email service provider and embedded into emails associated with an email campaign (step 1203). The vendor server 120 or email service provider may transmit the emails in the email campaign (step 1204). A user operating a customer device 150 may open the received email and select a mailto hyperlink (step 1205). The customer device 150 will automatically generate a response email in response to the selection of the mailto hyperlink and this email may be sent by the customer device 150 (step 1206). This response email includes a token and SPF/DKIM check information. The e-commerce system 140 may then perform the SPF/DKIM check and determine that the email is categorized as Confirm (step 1207). At this point, the e-commerce system may send an email to the customer with a mailto hyperlink including an email targeted token (step 1208). The customer, using a customer device 150 may then select the mailto hyperlink (step 1209). By selecting the mailto hyperlink, the customer device 150 will automatically generate a response email that includes the token, this response email is sent back to the e-commerce system 140 (step 1210). In the scenario shown in FIG. 12, the authentication fails (step 1211). At this point, the e-commerce system may send an email to the customer with an URL hyperlink directing the customer to a vendor/web checkout (step 1212). The customer, using a customer device 150 may then select the URL hyperlink and access a website associated with the vendor server 120 (steps 1213 and 1214). The customer may complete a web checkout and signup to be a registered customer of the e-commerce system (step 1215). The e-commerce system 140 may process the payment. Once the payment is processed, the e-commerce system 140 may notify the customer and/or vendor of a successful transaction, e.g. by transmitting an email, SMS or other electronic medium (step 1216).

Figure 13:
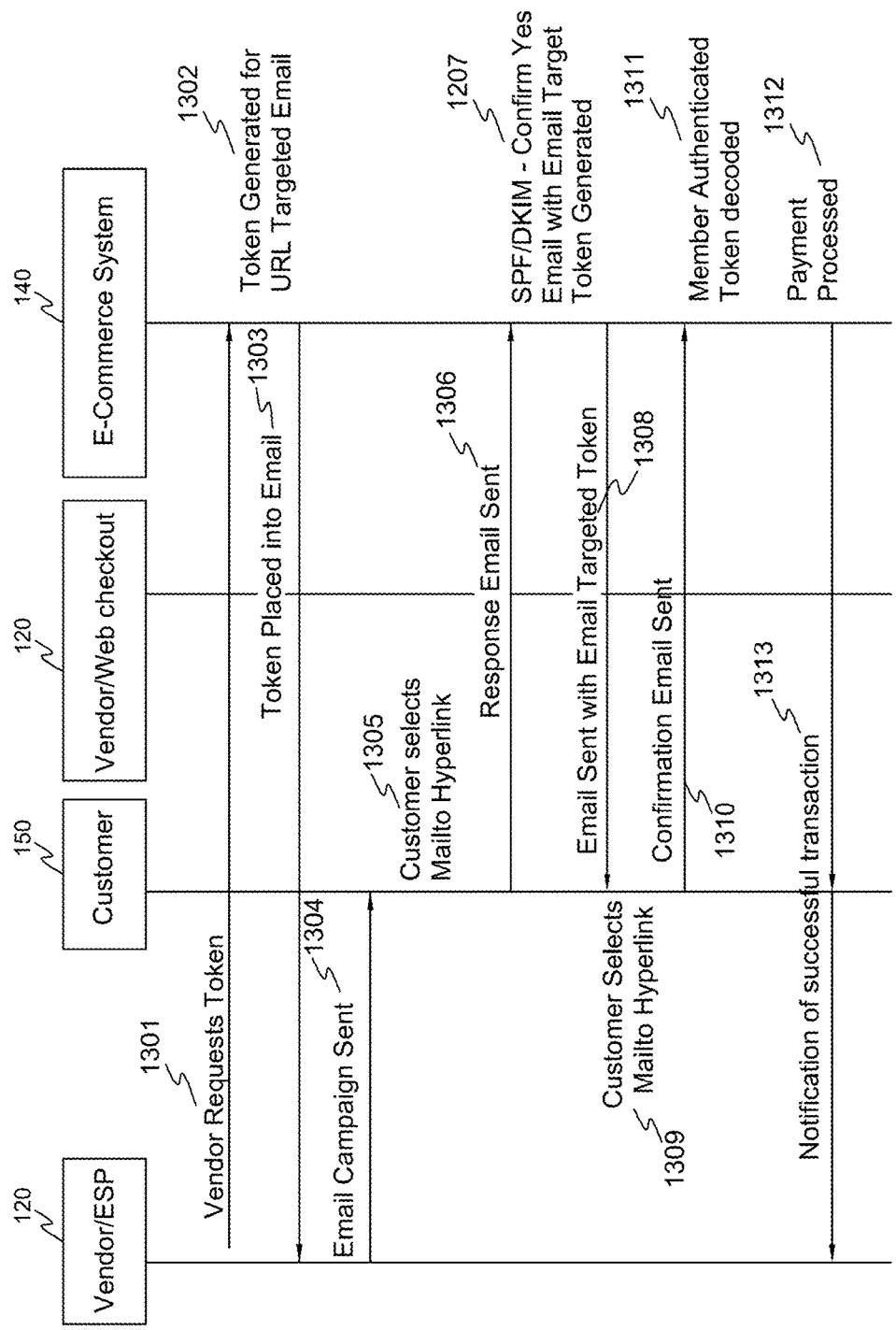
FIG. 13 is a transactional flow diagram for an e-commerce transaction where the response is categorized as Confirm.

FIG. 13 is a transactional flow diagram for an e-commerce transaction where the response is categorized as Confirm. As shown in FIG. 13, a vendor server 120 or an email service provider associated with a vendor may request a one or more tokens from the e-commerce system for an email campaign (step 1301). The e-commerce system 140 generates one or more tokens for an URL-targeted email (step 1302). The tokens may be sent to the vendor server 120 or email service provider and embedded into emails associated with an email campaign (step 1303). The vendor server 120 or email service provider may transmit the emails in the email campaign (step 1304). A user operating a customer device 150 may open the received email and select a mailto hyperlink (step 1305). The customer device 150 will automatically generate a response email in response to the selection of the mailto hyperlink and this email may be sent by the customer device 150 (step 1306). This response email includes a token and SPF/DKIM check information. The e-commerce system 140 may then perform the SPF/DKIM check and determine that the email is categorized as Confirm (step 1307). At this point, the e-commerce system may send an email to the customer with a mailto hyperlink including an email targeted token (step 1308). The customer, using a customer device 150 may then select the mailto hyperlink (step 1309). By selecting the mailto hyperlink, the customer device 150 will automatically generate a response email that includes the token, this response email is sent back to the e-commerce system 140 (step 1310). In the scenario shown in FIG. 12, the authentication is confirmed (step 1311). At this point, the e-commerce system 140 may process the payment (step 1312). Once the payment is processed, the e-commerce system 140 may notify the customer and/or vendor of a successful transaction, e.g. by transmitting an email, SMS or other electronic medium (step 1313).

Figure 14:
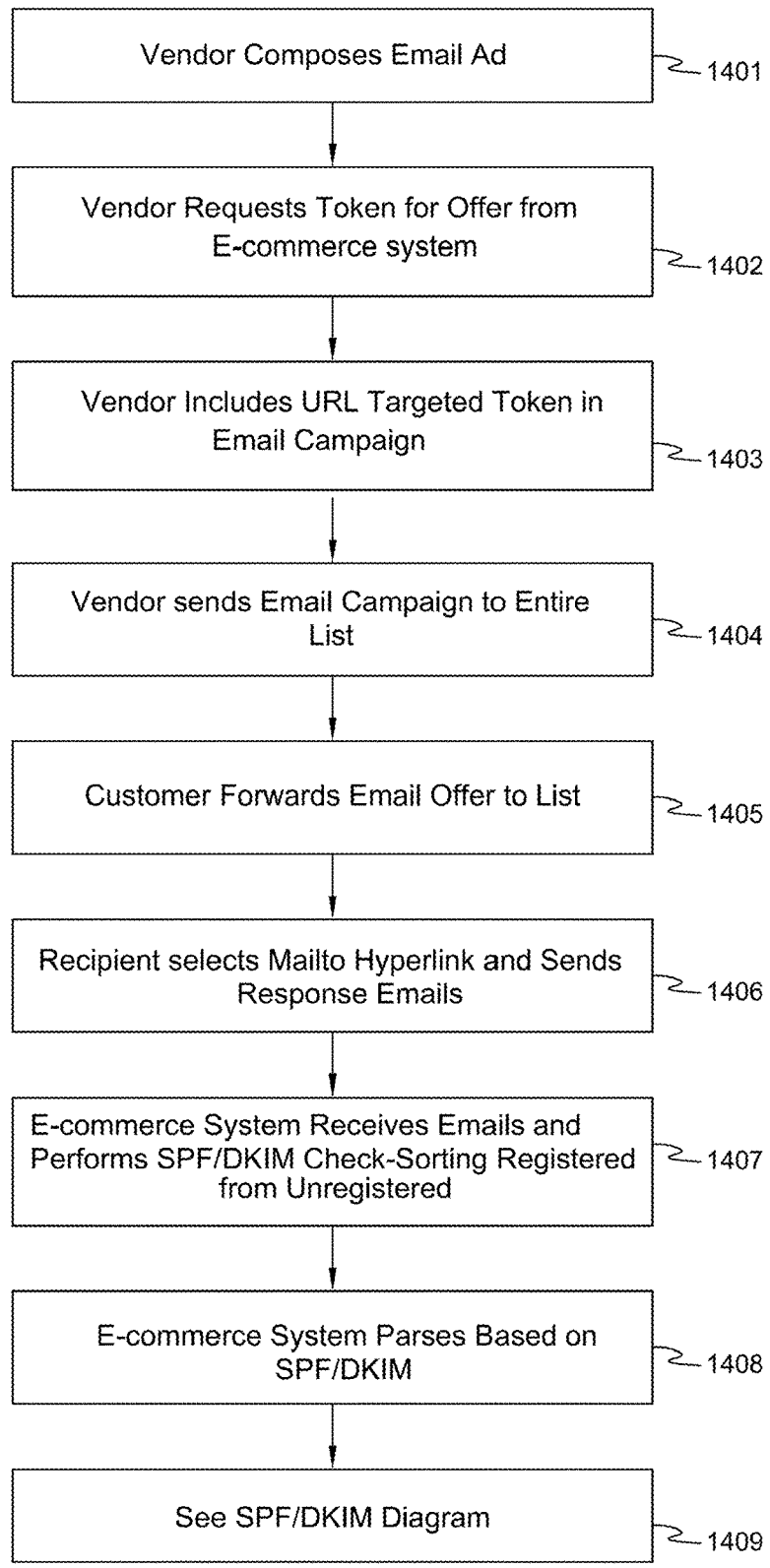
FIG. 14 is a flow diagram for a method of forwarding or referring an offer to another user.

The e-commerce system 140 may be configured to use bulk tokens to allows an offer in an email campaign to be forwarded and shared by customers regardless of whether they are registered customers or not. FIG. 14 is a flow diagram for a method of forwarding or referring an offer to another user (e.g. a friend). A vendor, wishing to generate an email campaign may compose an email advertisement (step 1401). The vendor may request or generate tokens for offers that are associated with the email campaign (step 1402). The vendor server 120 or email service provider associated with the vendor may embed one or more tokens into each email associated with an email campaign (step 1403). The vendor server 120 or an ESP may transmit the emails associated with an email campaign to a predetermined list of email addresses (step 1404). A user, operating a customer device 150, may open a received email associated with the email campaign and forward the email to one or more email addresses (step 1405). A recipient of the forwarded email message may open the email message and select the mailto hyperlink embedded in the forwarded email message. This will automatically generate a reply message. The recipient of the forwarded email message may send this automatically generated reply message (step 1406). The e-commerce system 140 may receive one or more emails from one or more recipients and then performs an SPF/DKIM check and sorts responses from registered and non-registered users (step 1407). The e-commerce system may then parse the emails based on the results of the SPF/DKIM check (step 1408). Based on this parsing, the system may be configured to perform as described in greater detail hereinafter.

Figure 15:
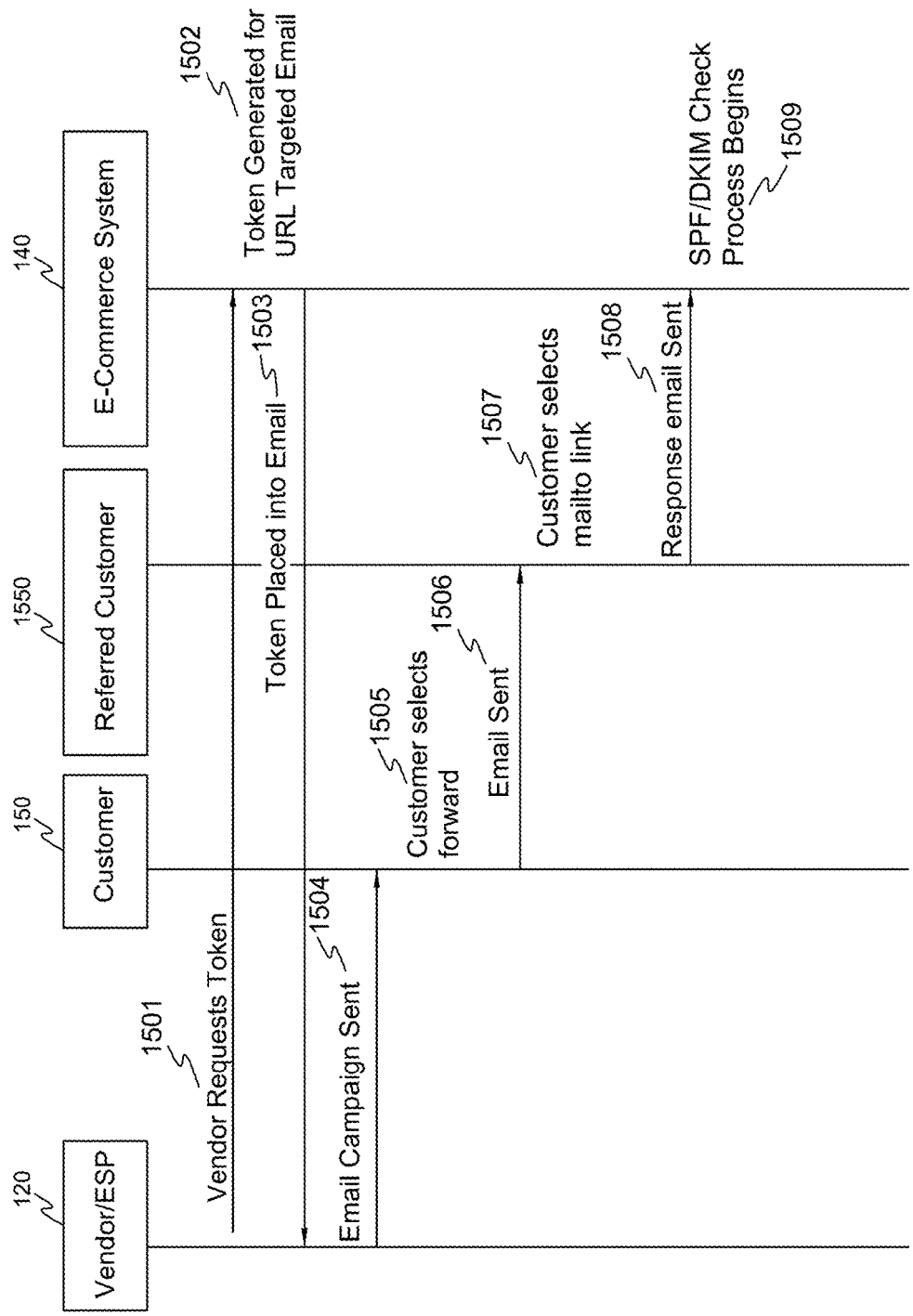
FIG. 15 is a transactional flow diagram for an e-commerce transaction for forwarded emails.

FIG. 15 is a transactional flow diagram for an e-commerce transaction for forwarded emails. As shown in FIG. 15, a vendor server 120 or an email service provider associated with a vendor may request a one or more tokens from the e-commerce system for an email campaign (step 1501). The e-commerce system 140 generates one or more tokens for an URL-targeted email (step 1502). The tokens may be sent to the vendor server 120 or email service provider and embedded into emails associated with an email campaign (step 1503). The vendor server 120 or email service provider may transmit the emails in the email campaign (step 1504). A user operating a customer device 150 may open the received email and forward the email to another customer 1550 (steps 1505 and 1506). This may be done either using the forward function of the email or may be a function of a mailto hyperlink that generates a forward message with pre populated messaging. The other customer 1550 may select the mailto hyperlink (step 1507). The customer device associated with the other customer 1550 will automatically generate a response email in response to the selection of the mailto hyperlink and this email may be sent (step 1508). This response email includes a token and SPF/DKIM check information. The e-commerce system 140 may then perform the SPF/DKIM check (step 1509). Based on the results of the SPF/DKIM check, the e-commerce system 140 may perform as described in FIG. 7.

Figure 16:
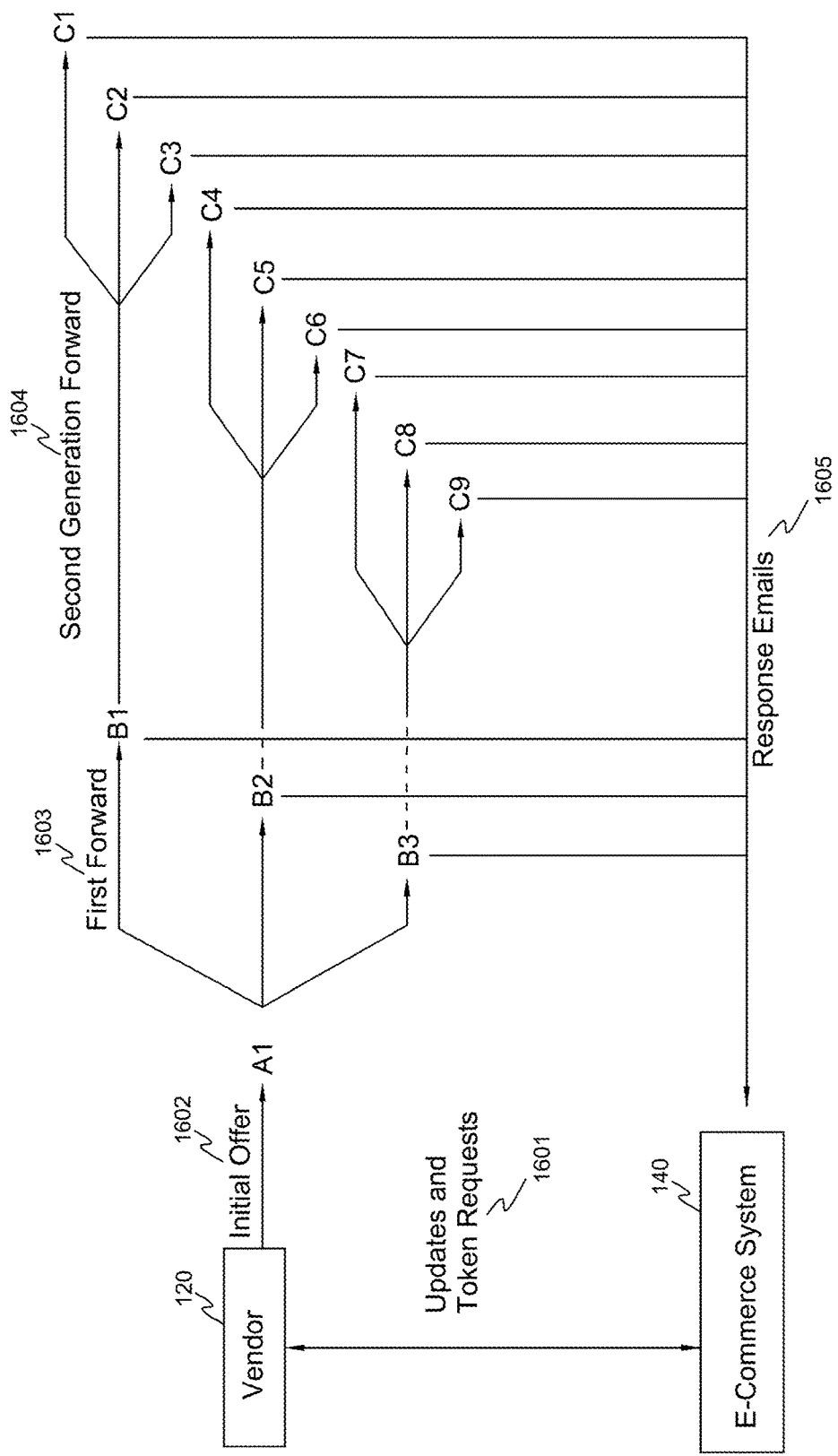
FIG. 16 shows a diagram of an example of the multiplying potential of email forwarding offers.

FIG. 16 shows a diagram of an example of the multiplying potential of email forwarding offers. The method described above may allow for an offer to go "viral." Wherein one offer may multiply into many valid offers sent to multiple email addresses. As shown in FIG. 1, a vendor server 120 may request tokens from an e-commerce system 140 (step 1601). Using the tokens, the vendor may transmit an email with an initial offer that includes a token (step 1602). A user A1 may forward that offer to three other users B1-B3 (step 1603), each of these users may respond to the email by selecting the embedded mailto hyperlink. Additionally, each of the users B1-B3 may forward to multiple users C1-C9, and each of these users may also response to the email. The response emails may be received by the e-commerce system 140 (step 1605). The e-commerce system 140 may provide updates and process payments each time a response email is received. The e-commerce system 140 is configured to respond to any email address that may transmit a response message. Potentially allowing a single email to be forwarded a multiple of times to an ever-growing group. It also allows those registered users to quickly purchase from forwarded emails, exploiting the social nature of online communication. This may be particularly useful in fundraising, where if each recipient is encouraged to send the request to three other people they know that the number of recipients grows as may be seen in FIG. 16 with each generation A B, and C. This diagram may expand to any number of generations D, E, F.

FIG. 17 shows an example web page that may be used by a first individual may make a payment request from another individual. The customer wishing to request a payment may use a customer device 150 access a web-based tool. As shown in FIG. 17, the web page 1700 may include multiple input fields 1701-1707. The customer logs-in, fills out the required information and then submits a request to be paid by the recipients of the email. For example, this information may include a bank account number, a routing number, a bank indicator, a payment amount, the requestor's email address, the addressee's email address and a message as shown in input fields 1701-1707. Once the requestor of payment submits the request, by selecting the send request button 1708 on the web page 1700 the e-commerce system 140 may generate an email that solicits payment and sends this email to the addressee's email address entered in input field 1706. The email may be addressed as being from the e-commerce system 140, a third Party, or from the Requestor. This feature may be used for more than one customer and also more than one amount.

There may also be non-monetary ways to reply such as "Wrong Amount" or "Already Paid". The customer receives the email and selects the mailto hyperlink and generates the response email that is sent back to the e-commerce system and the DKIM/SPF process begins, as shown in FIG. 7. In this scenario the message may be sent to any email address and the process for DKIM/SPF process may begin. Once the payment is processed, the money is placed in the bank account of the requestor of payment. In this example the tool is web based but in other embodiments it may be an application or a mobile smartphone app. In this example, this tool is designed as part of the e-commerce system but may be integrated into a third party such as an Email Service Provider, Email Client or online retailer or non-profit.

Figure 18:
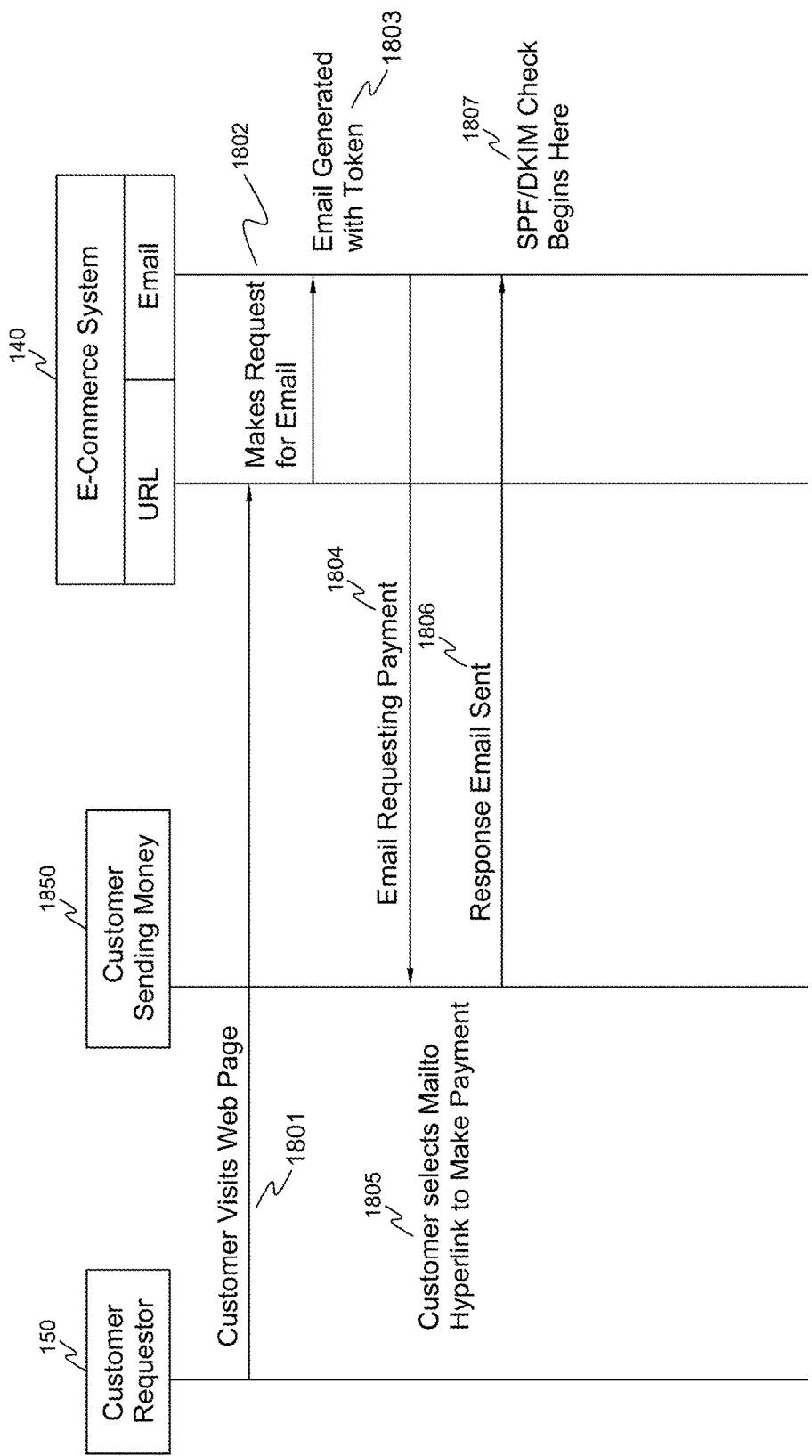
FIG. 18 is a transactional flow diagram of the payment request process.

FIG. 18 is a transactional flow diagram of the payment request process. A customer requestor may use a customer device 150 to visit a payment request web page 1700 (step 1801). The customer requestor may access the web page 1700 and request money from another individual. The e-commerce system 140 may then generate a payment request email including a token (steps 1802 and 1803). The e-commerce system 140 may transmit this payment request email to the other individual 1850 (step 1804). The other individual, using a customer device, may select a mailto hyperlink within the payment request email to confirm payment (step 1805). Selecting the mailto hyperlink may automatically generate a response email. This response email may be sent to the e-commerce system 140 (step 1806). The e-commerce system 140 may then begin the SPF/DKIM check (step 1807). Based on the results of the check, the e-commerce system may process the payment, reject the payment, or confirm payment as described herein.

Figure 19:
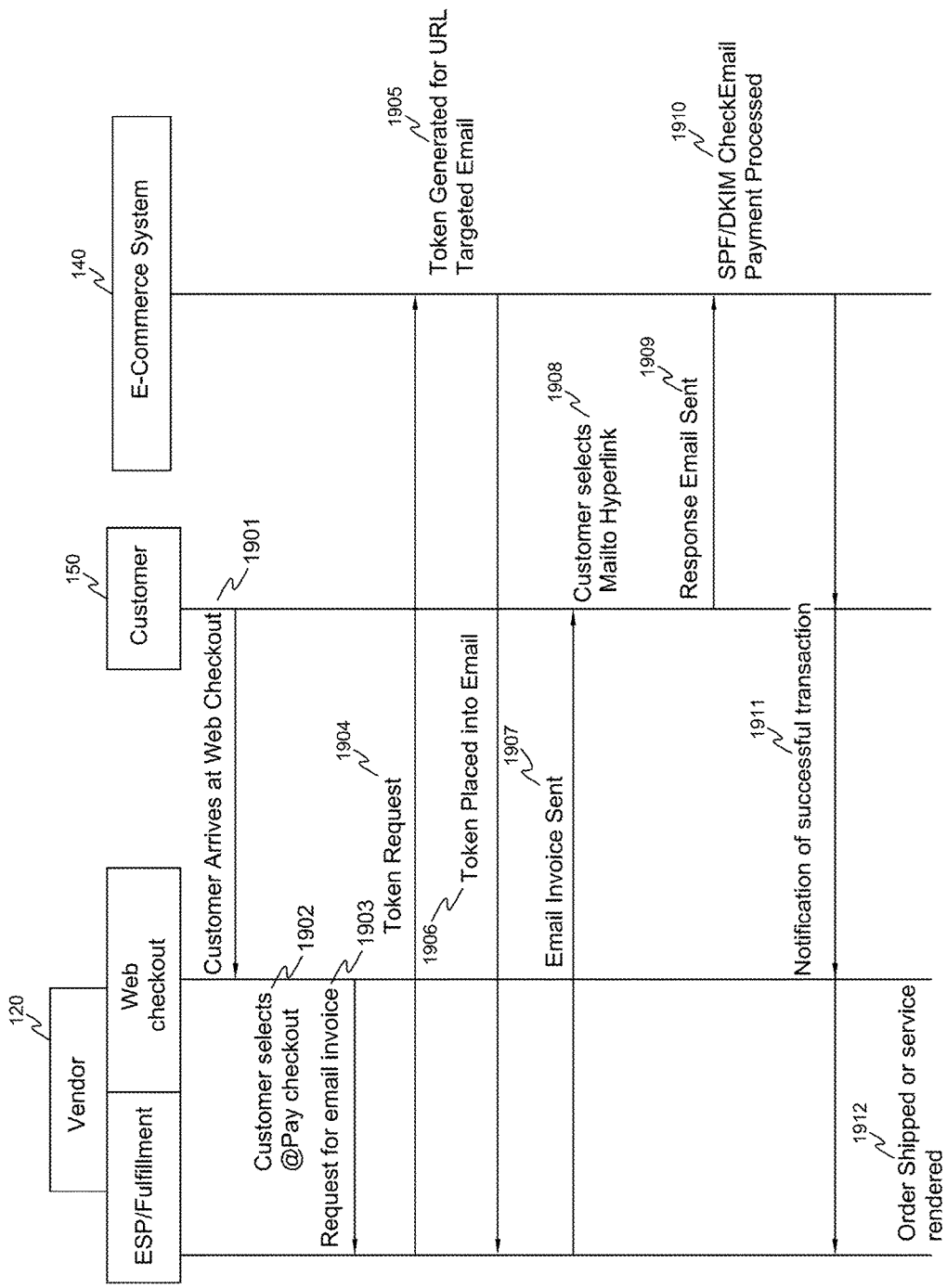
FIG. 19 is a transactional flow diagram of the website checkout. This may be used in connection with commercial websites which include a shopping cart or web checkout feature.

FIG. 19 is a transactional flow diagram of the website checkout. This may be used in connection with commercial websites which include a shopping cart or web checkout feature. As shown in FIG. 19, a customer accessing a vendor web page may select one or more items to be placed in a virtual shopping cart. The customer may then select a web checkout option (step 1901). In the shopping cart, the customer may be presented with a plurality of payment options. The customer, using a customer device 150 may select the e-commerce system's email based method of payment and confirms the order (step 1902). In another example, the customer may have the option to select a payment method directly on the browsing page, without needing to go to a separate shopping cart page. This may prompt the vendor server 120 to request an email invoice (step 1903). The vendor server 120 may then request a token (step 1904). The e-commerce system 140 may generate a token (step 1905). The e-commerce system may send the token to the vendor server 120 so that the vendor server 120 may insert the token into an email (or it may send it using other electronic communications) (step 1906). The email invoice is sent to a customer email address (step 1907). The vendor server 120 may include additional offers in the email invoice, which may include additional mailto hyperlinks associated with the additional offers.

The customer, using a customer device 150 may select the mailto hyperlink embedded in the email invoice (step 1908). This may automatically generate a response email which includes the token and is addressed to the e-commerce system 140. The response email may be sent to the e-commerce system 140 (step 1909). The system may then perform its SPF/DKIM check as well as token decode, and in the scenario shown in FIG. 19, it processes the payment (step 1910). The e-commerce system 140 may then notify the customer and vendor of the successful transaction (step 1911). The vendor may then ship the order or provide the service (step 1912). In this example, the token generator is located at the e-commerce system 140 however in an alternative the token generator may be located in the vendor server 120 or a third party. In another embodiment, the customer may need to write in their email address when they are in the shopping cart or the system may recognize the customer because of being logged on already.

Figure 20:
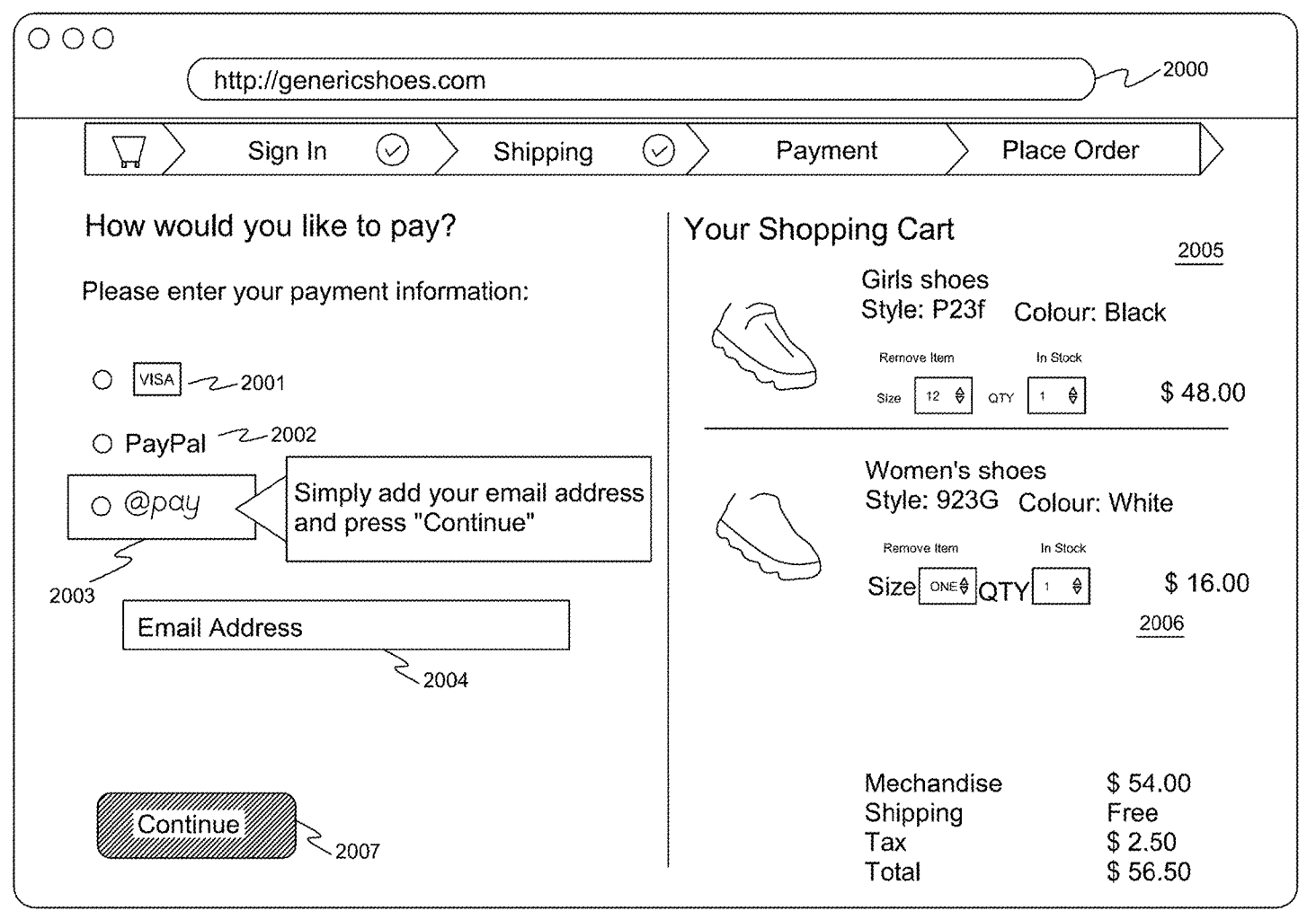

FIG. 20 shows an example web page 2000 that may be used in connection with a web checkout as described in FIG. 19. As shown in FIG. 20, the customer may select one or more payment methods using input fields 2001-2003 to pay for the products identified in product fields 2005 and 2006 associated with a web shopping cart. A customer using a customer device may adjust the size and quantity of products ordered in product fields 2005 and 2006. To use an email-based web checkout, as described herein, the user selects input field 2003. The user may be then asked to enter an email address into input field 2004. Once this has been entered, the user selects continue, and the order is ready for confirmation.

Figure 21:
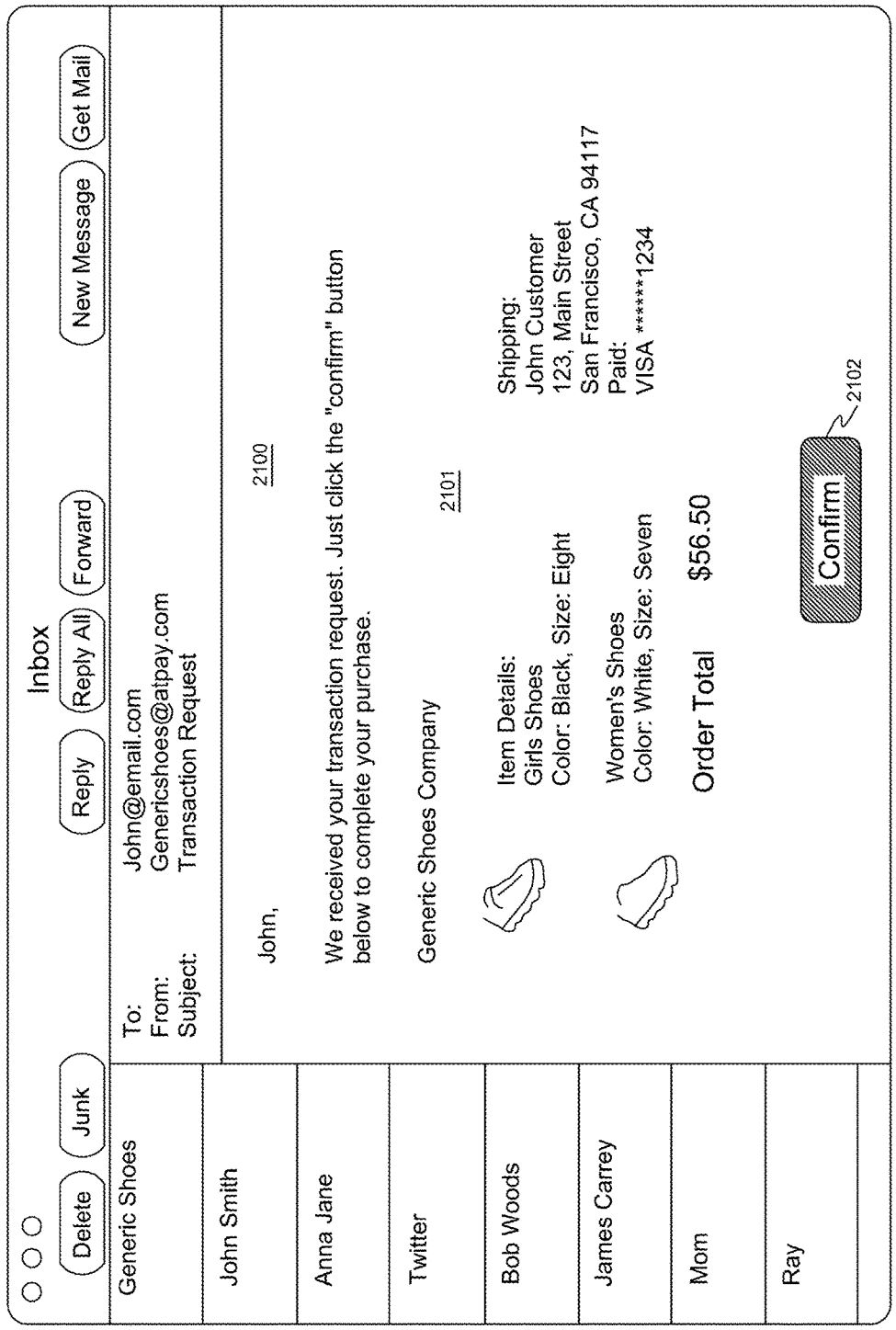
FIG. 21 is an example of a confirmation email message associated with the web checkout as described in FIGS. 19 and 20.

FIG. 21 is an example of an invoice email message associated with the web checkout as described in FIGS. 19 and 20. Once a user has selected, from a web page 2000 to complete a payment using an email-based web checkout. The user may receive an invoice email message 2100 as shown in FIG. 21. As shown in FIG. 21, the message body 2101 includes purchase information. To confirm the order, the user may select the confirm button 2102. The confirm button 2102 is associated with a mailto hyperlink which automatically generates a response email.

Figure 22:
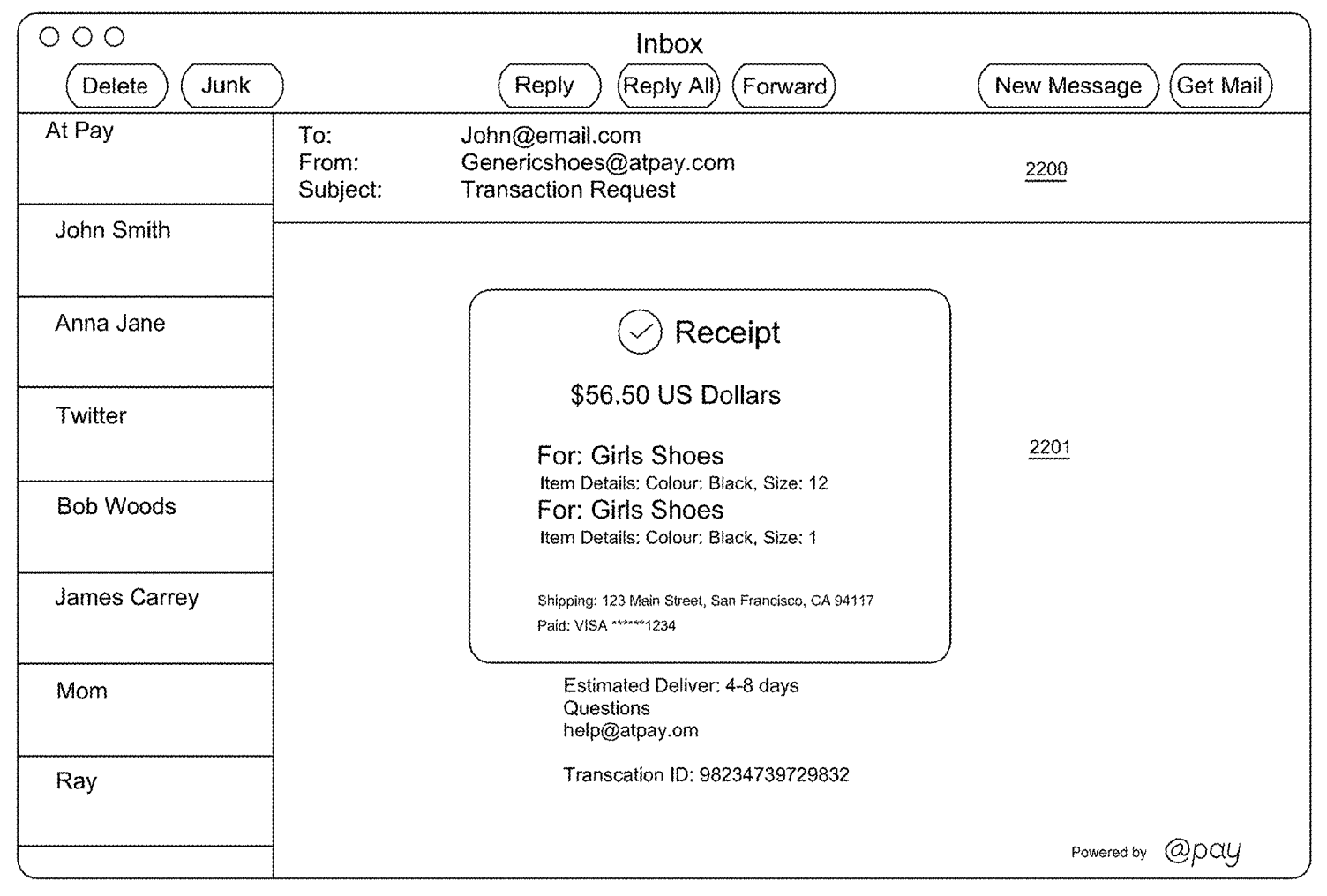

FIG. 22 is an example of a confirmation email message 2200 associated with the web checkout as described in FIGS. 19-21. Once a user has transmitted a reply message, the user may receive a confirmation email message 2200 as shown in FIG. 22. Confirmation email message 2200 may include an email body 2201 which may include information regarding the order. In another example, confirmation email message 2200 may include one or more cancel buttons, allowing a customer to cancel part or all of the order. The cancel buttons may be associated with mailto hyperlinks.

FIG. 23 shows another example where this tool may be an application or may be integrated with an email client to allow individuals and vendors to make a payment request and to send money by email fluidly between registered and non-registered customers as well as with vendors. The customer may associate an account with the e-commerce system 140 with multiple emails. This may be a function of a web-based email client or an application or mobile app. This embodiment allows registered users the same capability as a vendor. All registered users may have an account where they may send and receive money by email. FIG. 23 shows an example web page 2300 for an embodiment where the e-commerce system 140 is integrated with an email server. In this scenario, when the customer logs into their email account, they are logged into the e-commerce system 140. The customer may be able to send money as a function of their email account. For example, this may be performed through web-based email or an application on the customer device 150. A member may sign into their email account and be presented with web page 2300. As shown in FIG. 23, the web page 2300 may include multiple input fields 2302-2312. Input fields 2302, 2304, and 2306 allow the member to access their email inbox, outbox, and sent messages. Input field 2312 allows the member to review their messages. Input fields 2308 and 2310 allow the member to send money and get money using the email based process as discussed above. As shown in FIG. 23, the member may be allowed to send and receive money in a manner that is integrated with their email account. Further, as the selections are updated, the web browser unit 155 may update the web page 2300 to indicate additional, or more specific, questions that may be associated with the selections.

As shown in FIG. 23, the customer may logon to the web tool or application or to access an email client account and use the tool to either send or request money. The web tool may be configured to manage one or more email accounts and one or more accounts registered with the e-commerce system 140. Depending on the request the e-commerce system 140 may use different methods. To request money from another email address the process may use the above described method of bulk token in request emails. These emails may be forwarded to other email addresses however in another example the email-targeted tokens may be used without the ability to forward. The other function of the tool is if a registered member wishes to send money. The registered member may compose an email within the requesting tool with the intended amount to be sent and the email address they wish to send to. The e-commerce system 140 then looks up the email address of the receiver and if the email address is registered the money is transferred into the bank account of the receiver. Then the e-commerce system 140 notifies the sender and the receiver that the transaction was successful. The transfer of funds may not be directly from one entity to another but may require intermediaries and checks by third parties. If the receiver of the payment is not yet registered with the e-commerce system 140 then the system sends the email to the receiver with a URL hyperlink. The receiver selects the hyperlink and visits a web page where they may register and receive the payment. The e-commerce processes the payment and transfers the funds into the receiver's account. Then generates an email notification that the transfer had occurred. In the instance that the receiver does not have a bank account they may be provided a third party option to retrieve their payment. In another scenario the e-commerce system 140 may hold the money in accounts with third party banks or may be the banking institution or credit institution. In another scenario the money used in the transaction might be an electronic or alternative currency that exists within the e-commerce system 140 and is only converted into national currency upon request.

Figure 24:
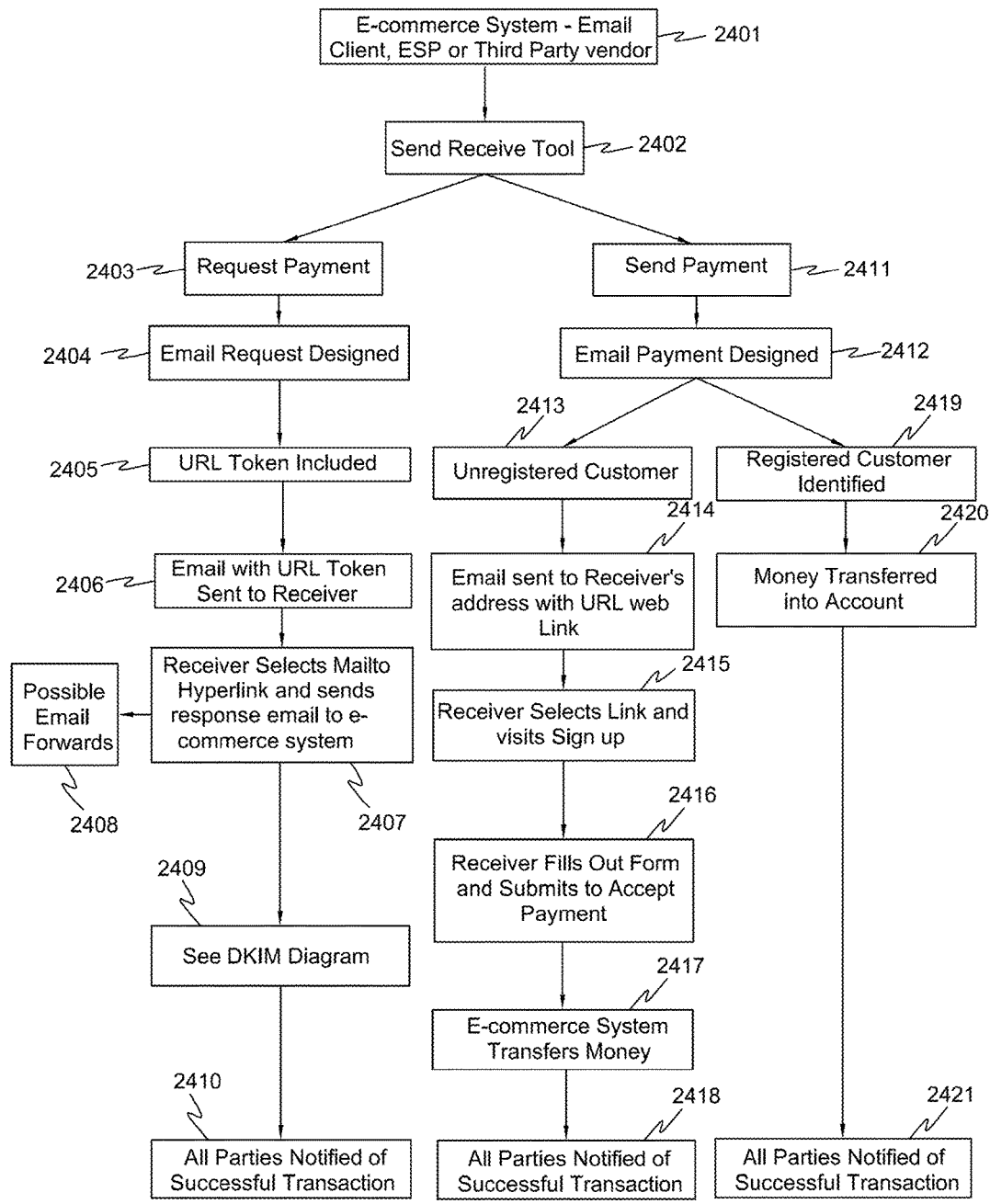
FIG. 24 is a flow diagram that shows steps to send and receive money.

FIG. 24 is a flow diagram that shows steps to send and receive money. As shown in FIG. 24, a user may access the e-commerce system 140 through an email client, an email service provider or a third part vendor (step 2401). The user may access the send/receive tool (step 2402). This may be similar to the web based example shown in FIG. 23.

In a first scenario, user may request a payment (step 2403). The e-commerce system 140 designs an email request (step 2404). An URL token is embedded into the email (step 2405). The email, including the URL token, is sent to the addressed recipient of the email. The URL based token allows users to forward the email to other recipients (2408). Alternatively or additionally, the user may select the mailto hyperlink embedded in the email and send a response email to the e-commerce system 140 (Step 2407). The e-commerce system 140 may then perform the SPF/DKIM authorization, shown e.g. in FIG. 7 (step 2409). If the transaction is successful, all parties are notified of the successful transaction (step 2410).

In another scenario, a user may wish to send payment. Similarly, the user may access the tool via web page 2300. The user may complete the information to send a payment (step 2411). The e-commerce system 140 may then determine how to complete the email payment (step 2412). The system may determine that the intended recipient is a non-registered customer (step 2413). In this scenario, the e-commerce system 140 may send an email to the recipients email address with an URL hyperlink (step 2414). The recipient may then select the URL hyperlink embedded in the email and access a registration web page (step 2415). The recipient may then complete a web based form and submit the form to accept payment (step 2416). This may also register the recipient with the e-commerce system 140. The e-commerce system 140 then facilitates transfer of the money (step 2417). Each party is notified of the successful transaction (step 2418).

If the customer is identified as a registered customer (step 2419) then the money may be transferred into the preferred account (step 2420).

As used herein, the term "processor" broadly refers to and is not limited to a single- or multi-core processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

As used to herein, the term "computer-readable medium" broadly refers to and is not limited to a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVDs, or BLURAY-Disc, or other type of device for electronic data storage.

Although the methods and features described above with reference to FIGS. 2-24 are described above as performed using the example system 100 of FIG. 1, the methods and features described above may be performed, mutatis mutandis, using any appropriate architecture and/or computing environment. Although features and elements are described above in particular combinations, each feature or element can be used alone or in any combination with or without the other features and elements. For example, each feature or element as described above with reference to FIGS. 1-24 may be used alone without the other features and elements or in various combinations with or without other features and elements. Sub-elements of the methods and features described above with reference to FIGS. 1-24 may be performed in any arbitrary order (including concurrently), in any combination or sub-combination.

What is claimed is:

1. A method that utilizes Simple Mail Transfer Protocol (SMTP) to improve security of an e-commerce system, the method comprising:
    receiving, by a receiver of the e-commerce system, a request from a vendor system for a bulk token for emailing to a plurality of potential customers, each potential customer being associated with a unique SMTP email address;
    generating, by a processor of the e-commerce system, the bulk token, wherein the bulk token includes at least a type field and an amount field, is associated with a mailto link and does not include an email field;
    transmitting, by a transmitter of the e-commerce system, the bulk token and the associated mailto link to the vendor system to embed into a first SMTP email to be sent to at least one of the unique SMTP email addresses associated with one of the plurality of potential customers, wherein activation of the associated mailto link by the potential customer generates a reply SMTP email from the unique SMTP email address associated with one of the at least one of the plurality of potential customers indicating a request for a transaction responsive to the first SMTP email and converts the bulk token to an email-targeted token;
    receiving, by the receiver of the e-commerce system, the at least one reply SMTP email from the unique SMTP email address associated with the said at least one of the plurality of potential customers, wherein the reply SMTP email includes the request for a transaction responsive to the mailto link that is activated including the email-targeted token;
    verifying, by the processor of the e-commerce system, the email-targeted token by performing a Sender Policy Framework (SPF) and DomainKeys Identified Mail (DKIM) validation of the at least one reply SMTP email that is received;
    validating, by the processor of the e-commerce system, the transaction based on the unique SMTP email address associated with the said at least one of the plurality of potential customers; and
    permitting, by the processor of the e-commerce system, the transaction to be processed by the e-commerce system, on a condition that the SPF and DKIM are verified and the transaction is validated.

2. The method of claim 1, further comprising:
    transmitting, by the transmitter at the e-commerce system, a web checkout email message including an URL hyperlink on a condition that the SPF and DKIM validations are rejected.

3. The method of claim 1, further comprising:
    transmitting, by the transmitter at the e-commerce system, a confirmation email message including a mailto link on a condition that the SPF and DKIM validations are classified as Confirm.

4. The method of claim 1, wherein the step of verifying the validity of the unique SMTP email address associated with the said at least one of the plurality of potential customers further comprises determining whether the reply SMTP email is sent from a registered or non-registered customer based on said unique SMTP email address from which the reply SMTP email was sent.

5. The method of claim 4, further comprising:
    transmitting, by the transmitter at the e-commerce system, a web checkout email message including an URL hyperlink on a condition that the reply SMTP email was sent from a non-registered customer.

6. An e-commerce system that utilizes Simple Mail Transfer Protocol (SMTP) to improve security of the e-commerce system, the system comprising:
    an interface that is communicatively coupled to a vendor system and a plurality of mobile units;
    a processor communicatively coupled to the interface, wherein the processor:
    receives, using the interface, a request from the vendor system for a bulk token for emailing to a plurality of potential customers, each potential customer being associated with a unique SMTP email address,
    generates the bulk token in response to receiving the request, wherein the bulk token includes at least a type field and an amount field, is associated with a mailto link and does not include an email field, transmits, using the interface, the bulk token and the associated mailto link to the vendor system to embed into a first SMTP email to at least one of the unique SMTP email addresses associated with one of the plurality of mobile units, wherein activation of the associated mailto link by a user of one or the plurality of mobile units generates a reply SMTP email from the unique SMTP email address associated with one of the at least one of the plurality of mobile units indicating a request for a transaction responsive to the first SMTP email and converts the bulk token to an email-targeted token;
    receives, using the interface, at least one reply SMTP email, from the unique SMTP email address associated with the said at least one of the plurality of potential customers, wherein the reply SMTP email includes the request for a transaction responsive to the mailto link that is activated including the email-targeted token,
    verifies the email-targeted token by performing a Sender Policy Framework (SPF) and DomainKeys Identified Mail (DKIM) validation of the reply SMTP email that is received,
    validates the transaction based on the unique SMTP email address associated with the said at least one of the plurality of potential customers; and permits the transaction to be processed by the e-commerce system, on a condition that the SPF and DKIM are verified and the transaction is validated.

7. The e-commerce system of claim 6, wherein the processor further:
    transmits, using the interface, a web checkout email message including an URL hyperlink on a condition that the SPF and DKIM validations are rejected.

8. The e-commerce system of claim 6, wherein the processor further:
    transmits, using the interface, a confirmation email message including a mailto link on a condition that the SPF and DKIM validations are classified as Confirm.

9. The e-commerce system of claim 6, wherein the processor further:

determines whether the reply SMTP email is sent from a registered or non-registered customer based on said unique SMTP email address from which the reply SMTP email was sent.

10. The e-commerce system of claim 9, wherein the processor further:
   transmits, using the interface, a web checkout email message including an URL hyperlink on a condition that the reply SMTP email was sent from a non-registered customer.

\* \* \* \* \*